US008764563B2

(12) United States Patent
Toyoda

(10) Patent No.: US 8,764,563 B2
(45) Date of Patent: Jul. 1, 2014

(54) VIDEO GAME SUPERIMPOSING VIRTUAL CHARACTERS ON USER SUPPLIED PHOTO USED AS GAME SCREEN BACKGROUND

(75) Inventor: Jun Toyoda, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 262 days.

(21) Appl. No.: 12/722,095

(22) Filed: Mar. 11, 2010

(65) Prior Publication Data

US 2010/0248825 A1 Sep. 30, 2010

(30) Foreign Application Priority Data

Mar. 24, 2009 (JP) .................................. 2009-072194

(51) Int. Cl.
*A63F 13/00* (2014.01)
(52) U.S. Cl.
USPC .................................... 463/33; 463/7; 463/32
(58) Field of Classification Search
USPC .................................................. 463/7, 32, 33
See application file for complete search history.

(56) References Cited

U.S. PATENT DOCUMENTS

| | | | |
|---|---|---|---|
| 8,072,470 B2* | 12/2011 | Marks ........................... | 345/632 |
| 8,152,637 B2* | 4/2012 | Watanabe et al. ............... | 463/33 |
| 2003/0179218 A1* | 9/2003 | Martins et al. ................. | 345/633 |
| 2006/0105838 A1* | 5/2006 | Mullen ........................... | 463/31 |
| 2006/0223635 A1* | 10/2006 | Rosenberg ...................... | 463/37 |
| 2007/0024527 A1* | 2/2007 | Heikkinen et al. ................ | 345/9 |
| 2008/0100620 A1* | 5/2008 | Nagai et al. .................... | 345/424 |
| 2010/0178966 A1* | 7/2010 | Seydoux .......................... | 463/2 |
| 2010/0203933 A1* | 8/2010 | Eyzaguirre et al. ............... | 463/2 |

FOREIGN PATENT DOCUMENTS

| | | |
|---|---|---|
| JP | A-2005-237606 | 9/2005 |
| JP | B-4181211 | 11/2008 |

* cited by examiner

*Primary Examiner* — Lawrence Galka
(74) *Attorney, Agent, or Firm* — Oliff PLC

(57) ABSTRACT

A feature image area that has a similar feature (e.g., quadrangular outline) is extracted from an original two-dimensional image photographed by a player. When a game has started, the original two-dimensional image is displayed as the background of a game stage, and a target character 4 is caused to appear or disappear from the extracted feature image area at a random appearance frequency and a random appearance speed. When the player has touched the target character 4, points are added to the score of the player.

13 Claims, 20 Drawing Sheets

[ORIGINAL TWO-DIMENSIONAL IMAGE]

[EXTRACTED APPROXIMATE OUTLINES]

[EXTRACTED FEATURE IMAGE AREAS]

[UNITED FEATURE IMAGE AREAS]

[APPROXIMATE THREE-DIMENSIONAL MODEL GENERATED
FROM ORIGINAL TWO-DIMENSIONAL IMAGE]

[APPEARANCE DIRECTION CALCULATED
FOR EACH FEATURE IMAGE AREA]

[APPEARANCE/DISAPPEARANCE OF
TARGET CHARACTER FROM FEATURE IMAGE AREA]

[APPEARANCE/DISAPPEARANCE OF TARGET CHARACTER HAVING
SIZE BASED ON FEATURE IMAGE AREA]

FIG. 13

| 504 | CHARACTER INITIAL SETTING DATA | | |
|---|---|---|---|
| | CHARACTER TYPE (504a) | SELECTION CONDITION (504b) | POINTS (504c) |
| |  [CR1: GRAY] | COLOR ATTRIBUTE: BLACK, SHAPE OF FEATURE IMAGE AREA: QUADRANGULAR | 5 |
| |  [CR2: RED] | COLOR ATTRIBUTE: RED, SHAPE OF FEATURE IMAGE AREA: QUADRANGULAR | 10 |
| |  [CR3: BLUE] | COLOR ATTRIBUTE: YELLOW, SHAPE OF FEATURE IMAGE AREA: QUADRANGULAR, SIZE OF FEATURE IMAGE AREA: 5% OR LESS | 15 |
| |  [CR4: BLUE] | COLOR ATTRIBUTE: YELLOW, SHAPE OF FEATURE IMAGE AREA: ELLIPTICAL, SIZE OF FEATURE IMAGE AREA: 5% OR LESS | 15 |
| | ⋮ | ⋮ | ⋮ |

504d — CHARACTER SIZE SETTING DATA

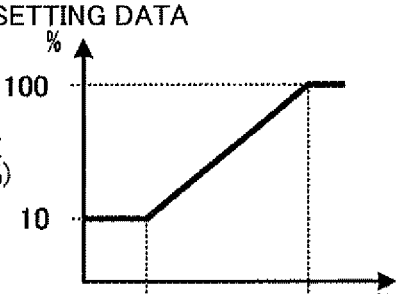

FIG. 14

510 — DIFFICULTY LEVEL POINT SETTING TABLE

| FEATURE IMAGE AREA NUMBER CONDITION (510a) | APPEARANCE POSITION POINTS (510b) |
|---|---|
| 0~5 | 2 |
| 6~10 | 5 |
| 11~15 | 7 |
| ⋮ | ⋮ |

| FEATURE IMAGE AREA SIZE CONDITION (510c) | APPEARANCE SIZE POINTS (PER FEATURE IMAGE AREA) (510d) |
|---|---|
| LESS THAN 5% OF IMAGE SIZE | 10 |
| 5% TO LESS THAN 10% OF IMAGE SIZE | 5 |
| 10% TO LESS THAN 20% OF IMAGE SIZE | 3 |
| ⋮ | ⋮ |
| 30% OR MORE OF IMAGE SIZE | 0 |

FIG. 15

514 FEATURE IMAGE AREA SETTING DATA

| IMAGE DATA NAME | PICT001 |
|---|---|

514a

| LABEL | AREA IDENTIFICA-TION DATA | APPEARANCE DIRECTION VECTOR | COLOR ATTRI-BUTE | FEATURE IMAGE AREA SIZE | CHARACTER TYPE | CHARACTER SIZE | ... |
|---|---|---|---|---|---|---|---|
| L1 | P1 | Vc1 | RED | 20% | CR2 | 100% | ... |
| L2 | P2 | Vc2 | BLACK | 8% | CR1 | 55% | ... |
| L4 | P4 | Vc4 | BLUE | 13% | CR4 | 67% | ... |
| ⋮ | ⋮ | ⋮ | ⋮ | ⋮ | ⋮ | ⋮ | ... |

516 GAME STAGE IMAGE CANDIDATE DATA

| IMAGE DATA NAME | APPEARANCE POSITION POINTS | APPEARANCE SIZE POINTS | DIFFICULTY LEVEL POINTS | GAME STAGE NUMBER |
|---|---|---|---|---|
| PICT001 | 5 | 12 | 17 | 2 |
| PICT002 | 10 | 20 | 30 | 7 |
| PICT003 | 2 | 5 | 7 | 1 |
| ⋮ | ⋮ | ⋮ | ⋮ | ⋮ |

516a 516b 516c 516d 516e

FIG. 21
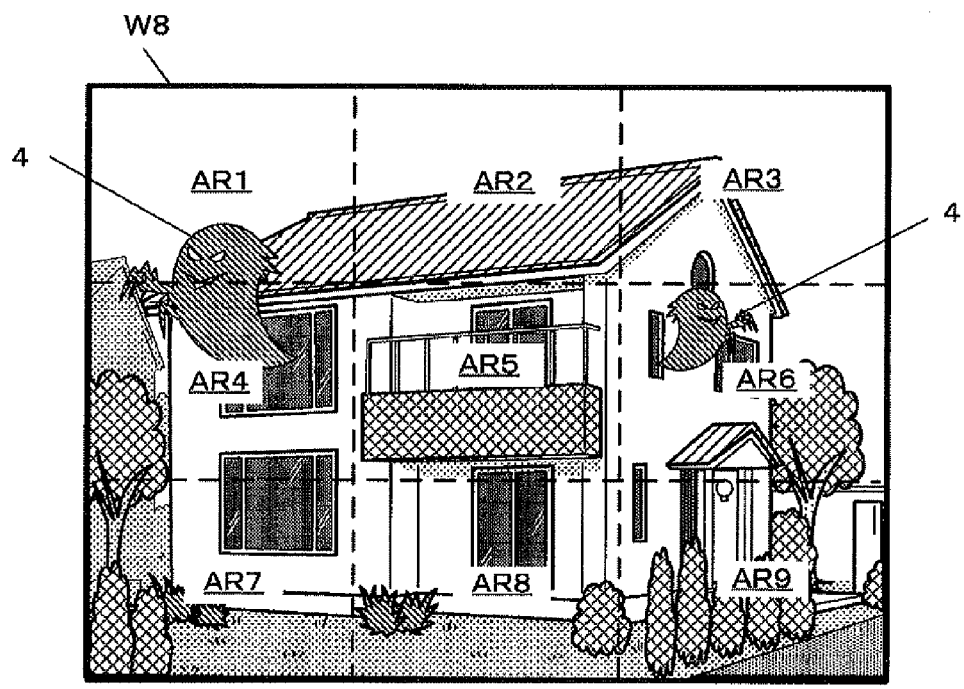
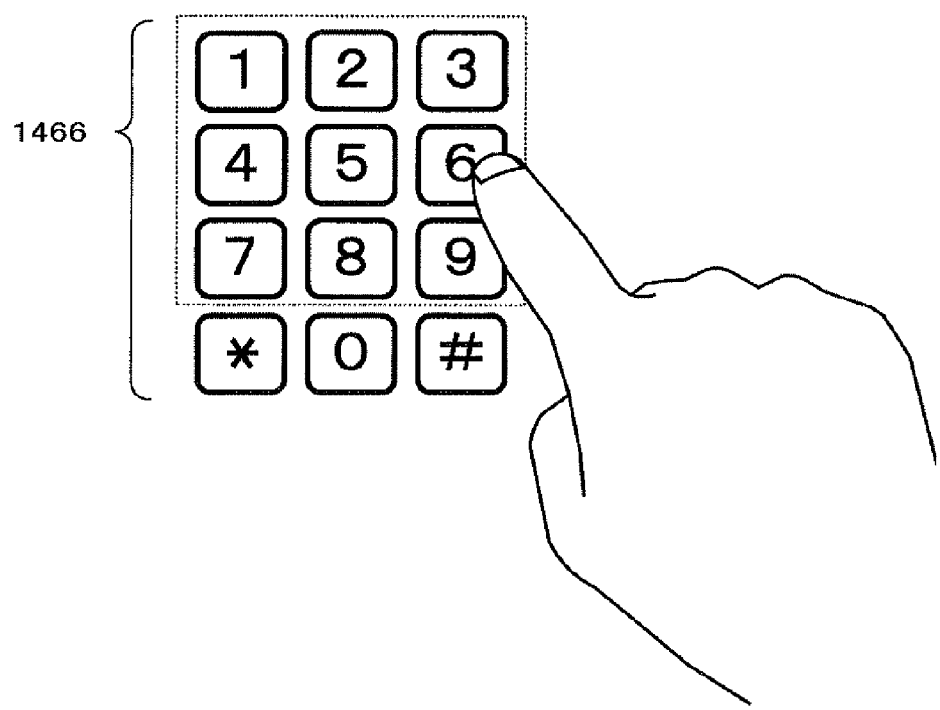

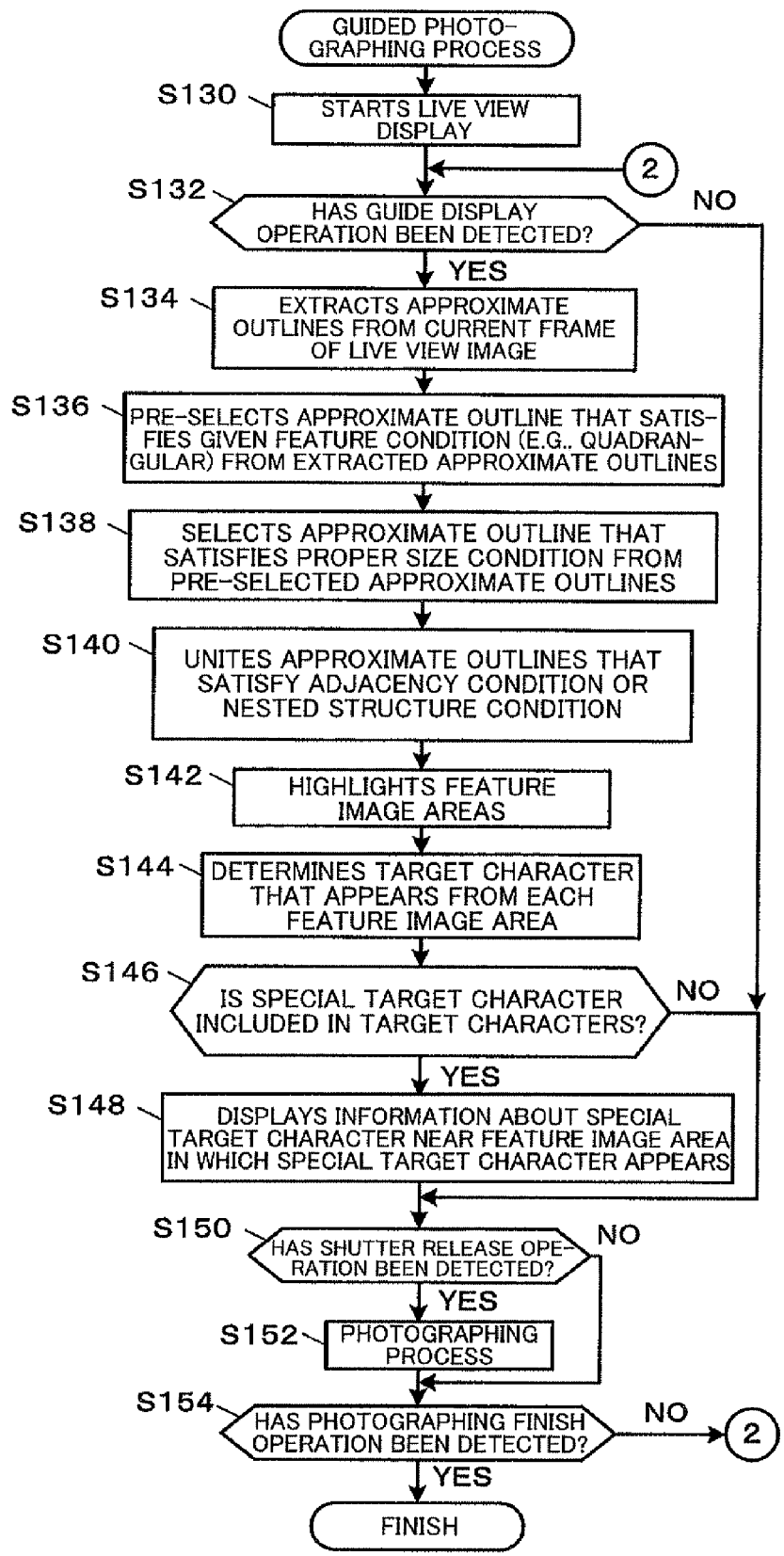

VIDEO GAME SUPERIMPOSING VIRTUAL CHARACTERS ON USER SUPPLIED PHOTO USED AS GAME SCREEN BACKGROUND

Japanese Patent Application No. 2009-72194 filed on Mar. 24, 2009, is hereby incorporated by reference in its entirety.

BACKGROUND

An information processing device that has an imaging function and allows the imaging function to be utilized from application software during startup has been known (see Japanese Patent No. 4181211, for example).

On the other hand, a video game normally utilizes a game screen (image) that is provided in advance by the game producer. For example, a shooting game or a role-playing game (RPG) utilizes an image that matches the world view of each game as the background of the game screen. Such a game allows the player to enjoy an extraordinary world view by playing the game.

SUMMARY

According to one aspect of the invention, there is provided a method comprising:

detecting an image area that satisfies a feature image area condition from a photographed image, the feature image area condition being defined as a feature condition that is used for determining an image area on which a character is superimposed;

displaying the photographed image; and causing the character to appear from the image area that is included in the photographed image and satisfies the feature image area condition.

According to another aspect of the invention, there is provided a game device that controls a game process while displaying a character, the game device comprising:

an image area detection section that detects an image area that satisfies a feature image area condition from a photographed image, the feature image area condition being defined as a feature condition that is used for determining an image area on which a character is superimposed;

an image display control section that displays the photographed image; and a character display control section that causes the character to appear from the image area that is included in the photographed image and detected by the image area detection section.

BRIEF DESCRIPTION OF THE DRAWINGS

FIG. 13 is a view showing a data configuration example of character initial setting data.

FIG. 14 is a view showing a data configuration example of a difficulty level point setting table (TBL).

FIG. 15 is a view showing a data configuration example of feature image area setting data.

FIG. 16 is a view showing a data configuration example of game stage image candidate data.

FIG. 21 is a view schematically showing an operation input method according to the second embodiment.

FIG. 25 is a flowchart illustrative of the flow of a guided photographing process according to the third embodiment.

DESCRIPTION OF EXEMPLARY EMBODIMENTS

Figure 1:
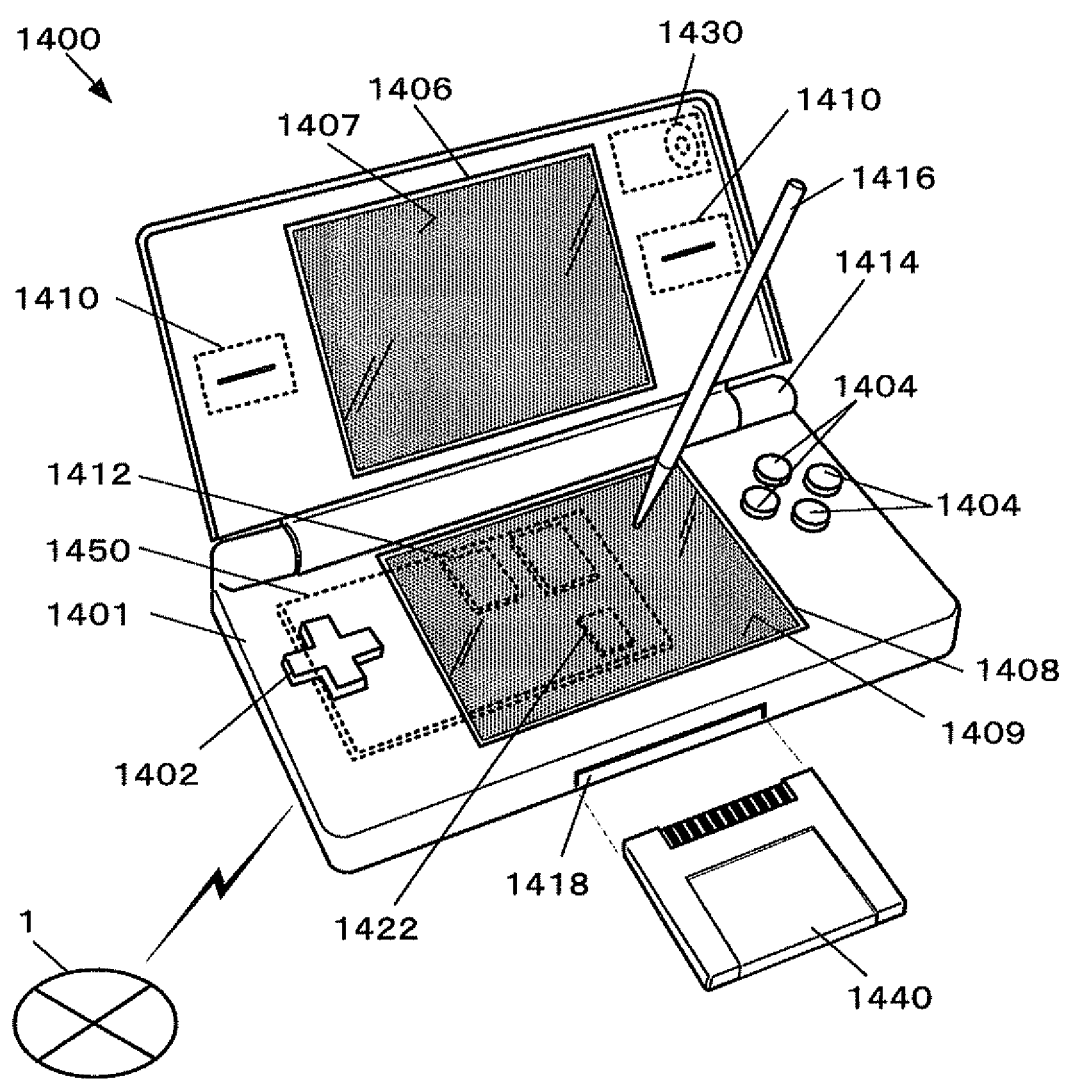
FIG. 1 is a view showing a system configuration example of a portable game device.

Several embodiments of the invention may implement a novel game in which a real world and a game world are united by advantageously incorporating the real world in the game.

According to one embodiment of the invention, there is provided a method comprising:

detecting an image area that satisfies a feature image area condition from a photographed image, the feature image area condition being defined as a feature condition that is used for determining an image area on which a character is superimposed;

displaying the photographed image; and causing the character to appear from the image area that is included in the photographed image and satisfies the feature image area condition.

According to another embodiment of the invention, there is provided a game device that controls a game process while displaying a character, the game device comprising:

an image area detection section that detects an image area that satisfies a feature image area condition from a photographed image, the feature image area condition being defined as a feature condition that is used for determining an image area on which a character is superimposed;

an image display control section that displays the photographed image; and a character display control section that causes the character to appear from the image area that is included in the photographed image and detected by the image area detection section.

According to the above configuration, an area that has a similar feature is detected from the photographed image, and the character is caused to appear from the detected area. As the feature image area condition, various parameters can be utilized insofar as whether or not the parameters are satisfied as can be determined by image processing. Examples of the parameters include the shape of an approximate outline, a color, a contrast, a position within the screen, and the like.

According to the above embodiment, a novel game in which a real world and a game world are united can be implemented by utilizing an image obtained by photographing the real world as the background of the game, for example.

The method may further comprise:

calculating a score based on a given operation input performed by a user on the character that has appeared from the image area.

According to the above configuration, a game that uses the character that appears from the feature image area as the target character can be implemented.

In the method, the causing of the character to appear from the image area may include causing the character to appear respectively from each image area that satisfies the feature image area condition at intervals of time.

According to the above configuration, it is possible to implement a game in which characters appear from image areas having a similar feature at intervals of time, for example. Examples of such a game include a whack-a-mole game.

In the method, the causing of the character to appear from the image area may include causing the character to appear from the image area that satisfies the feature image area condition while increasing or decreasing the size of the character based on the size of the image area.

According to the above configuration, the size of the character can be changed based on the size of the image area having a similar feature. Therefore, the size of the character that appears from the feature image area can be changed based on the displayed image. For example, when the game is configured so that the player performs an operation input aimed at the character that appears from the feature image area, the difficulty level of the game can be changed based on the size of the character.

In the method, the feature image area condition may include a plurality of conditions; and the causing of the character to appear from the image area may include causing the character to appear from the image area while changing the type and/or the number of characters based on a condition among the plurality of conditions that has been satisfied by the image area.

This makes it possible to cause characters of the type and/or the number corresponding to the satisfied condition to appear from the image area that satisfies the feature image area condition. Specifically, a more interesting game can be implemented by causing a character relevant to the photographed image to appear in the game.

For example, it is possible to implement a collection game in which a character that corresponds to the feature area appears from the feature area of the photographed image, and the player captures and collects the character.

In the method, the detecting of the image area may include detecting an image area that satisfies the feature image area condition based on shape and/or color information about the photographed image.

According to the above configuration, it is possible to implement a situation in which a character appears from an object that is included in the photographed image and has a similar shape or color, for example. Therefore, the player can immediately determine an area from which a character appears.

The method may further comprise:

controlling a game process by sequentially reading a photographed image among a plurality of photographed images, detecting an image area that satisfies the feature image area condition, displaying the photographed image, and causing the character to appear from the image area that satisfies the feature image area condition.

According to the above configuration, the game process can be controlled while sequentially utilizing each of a plurality of photographed images as the background of the game screen. Specifically, it is possible to sequentially utilize the photographed images in a game provided with a plurality of game stages or scenes.

The method may further comprise:

detecting an image area that satisfies the feature image area condition from each of a plurality of photographed images;

selecting an image used in a game from the plurality of photographed images based on the detection result for each of the plurality of photographed images;

displaying the selected image; and causing the character to appear from the selected image.

According to the above configuration, an image used in the game can be automatically selected from the photographed images based on the detection result (e.g., presence or absence, number, position, and size of image areas having a similar feature). This makes it possible to exclude an image that is not appropriate from the viewpoint of game balance, or classify the images taking account of the difficulty level of the game, so that a well-balanced game can be implemented.

The method may further comprise:

determining a use order of the selected image; and displaying the selected image and causing the character to appear from the selected image based on the use order.

According to the above configuration, the display order of the image in the game can be automatically determined based on the detection result for the image area that satisfies the feature image area condition. For example, since a character appears from the detected image area, the number of detected image areas affects the difficulty level of the game. Therefore, a standard in which the difficulty level gradually increases along with the game stage can be automatically implemented by automatically determining the display order of the image in the game based on the detection result for the image area that satisfies the feature image area condition.

According to another embodiment of the invention, there is provided a computer-readable information storage medium storing a program that causes a computer to execute the above method.

The term "information storage medium" used herein includes a magnetic disk, an optical disk, an IC memory, and the like.

Exemplary embodiments to which the invention is applied are described below. Note that embodiments to which the invention may be applied are not limited to the following exemplary embodiments.

First Embodiment

A first embodiment to which the invention is applied is described below taking an example in which a whack-a-mole game is executed by a portable game device that allows application software to call and utilize a digital camera function.

Configuration of Game Device

FIG. 1 is an external view illustrative of a configuration example of a portable game device. A portable game device 1400 according to this embodiment includes an arrow key 1402 and button switches 1404 that allow the player to input a game operation, a first liquid crystal display 1406, a second liquid crystal display 1408, a speaker 1410, a control unit 1450, and a flip-top main body 1401 that can be opened and closed through a hinge 1414, the arrow key 1402, the button switches 1404, the first liquid crystal display 1406, the second liquid crystal display 1408, the speaker 1410, and the control unit 1450 being provided on or in the main body 1401.

Touch panels 1407 and 1409 that allow the player to perform a touch operation by touching an arbitrary position within the display screen using a stylus pen 1416 or the like are provided on the display surfaces of the first liquid crystal display 1406 and the second liquid crystal display 1408, respectively.

The main body 1401 includes a memory card reader 1418 that reads and writes data from and into a memory card 1440 (i.e., computer-readable information storage medium). The memory card 1440 stores a program and setting data necessary for the control unit 1450 of the portable game device 1400 to execute various game play calculation processes. The main body 1401 is also provided with a built-in battery, a power button, a volume control button, and the like (not shown).

The touch panels 1407 and 1409 respectively cover almost the entire area of the display screens of the first liquid crystal display 1406 and the second liquid crystal display 1408 so that images displayed on the first liquid crystal display 1406 and the second liquid crystal display 1408 can be observed from the outside. When the player has performed a touch operation using the stylus pen 1416 (or finger or the like), the coordinates of the touch position in an orthogonal Xt-Yt coordinate system (origin: upper left) can be output to the control unit 1450.

The control unit 1450 corresponds to a game device control board, and includes a processor (e.g., central processing unit (CPU), graphics processing unit (GPU), and digital signal processor (DSP)), an application-specific integrated circuit (ASIC), and an IC memory (e.g., VRAM, RAM, and ROM).

The control unit 1450 also includes a wireless communication module 1412, a triaxial acceleration sensor 1422, a driver circuit that drives the first liquid crystal display 1406 and the liquid crystal display 1408, a driver circuit that drives the touch panel 1407 and the touch panel 1409, a circuit that receives signals from the arrow key 1402 and the button switches 1404, an amplifier circuit that outputs a sound signal to the speaker 1124, and an interface circuit (I/F circuit) such as a signal input-output circuit that exchanges signals with the memory card reader 1418. The elements provided in the control unit 1450 are electrically connected through a bus circuit so that data can be read from and written into the elements, or signals can be exchanged between the elements.

The triaxial acceleration sensor 1422 detects accelerations in an X-axis direction, a Y-axis direction, and a Z-axis direction that perpendicularly intersect to detect a change in posture or position of the portable game device 1400, and outputs detection signals to the control unit 1450. Note that the portable game device 1400 may include a gyrosensor instead of, or in addition to, the acceleration sensor. Alternatively, the portable game device 1400 may further include a magnetic sensor that detects a change in position or posture of the portable game device 1400 based on terrestrial magnetism.

The control unit 1450 reads a program and data stored in the memory card 1440 through the memory card reader 1418, and temporarily stores the program and data in the IC memory. The control unit 1450 performs a calculation process by executing the program read from the memory card 1440, and controls each section of the portable game device 1400 (executes the game) based on operation inputs from the arrow key 1402, the button switches 1404, and the touch panels 1407 and 1409.

Although this embodiment employs a configuration in which the portable game device 1400 reads a necessary program and setting data from the memory card 1440, it is also possible to employ a configuration in which the portable game device 1400 connects to a cable/wireless communication channel 1 (e.g., Internet, local area network (LAN), or wide area network (WAN)) through the wireless communication module 1412, and downloads a necessary program and setting data from an external device.

The portable game device 1400 includes an image sensor module 1430 (i.e., digital imaging section) that is provided on the outer surface of the main body 1401. A shutter release function is assigned to a given switch among the button switches 1404, and a live view image is displayed on the first liquid crystal display 1406 or the second liquid crystal display 1408. This allows the user to photograph an arbitrary photographing target and store digital image data in the memory card 1440 or the like in the same manner as a live viewfinder-type digital camera. The digital camera function is incorporated in the basic system of the portable game device 1400, and can be appropriately called and utilized from application software.

Outline of Game

In this embodiment, the player photographs and acquires an image used as a game stage before starting the game.

For example, the second liquid crystal display 1408 displays a photographing screen W2 (see FIG. 2) that includes a message that prompts the user to photograph an image, and a photographing guide that indicates a function assigned to each button switch 1404, and the digital camera function of the portable game device 1400 is called so that an image (live view image W4) that is currently detected by the image sensor module 1430 is displayed on the first liquid crystal display 1406 in real time (i.e., the first liquid crystal display 1406 functions as a live viewfinder).

Figure 2:
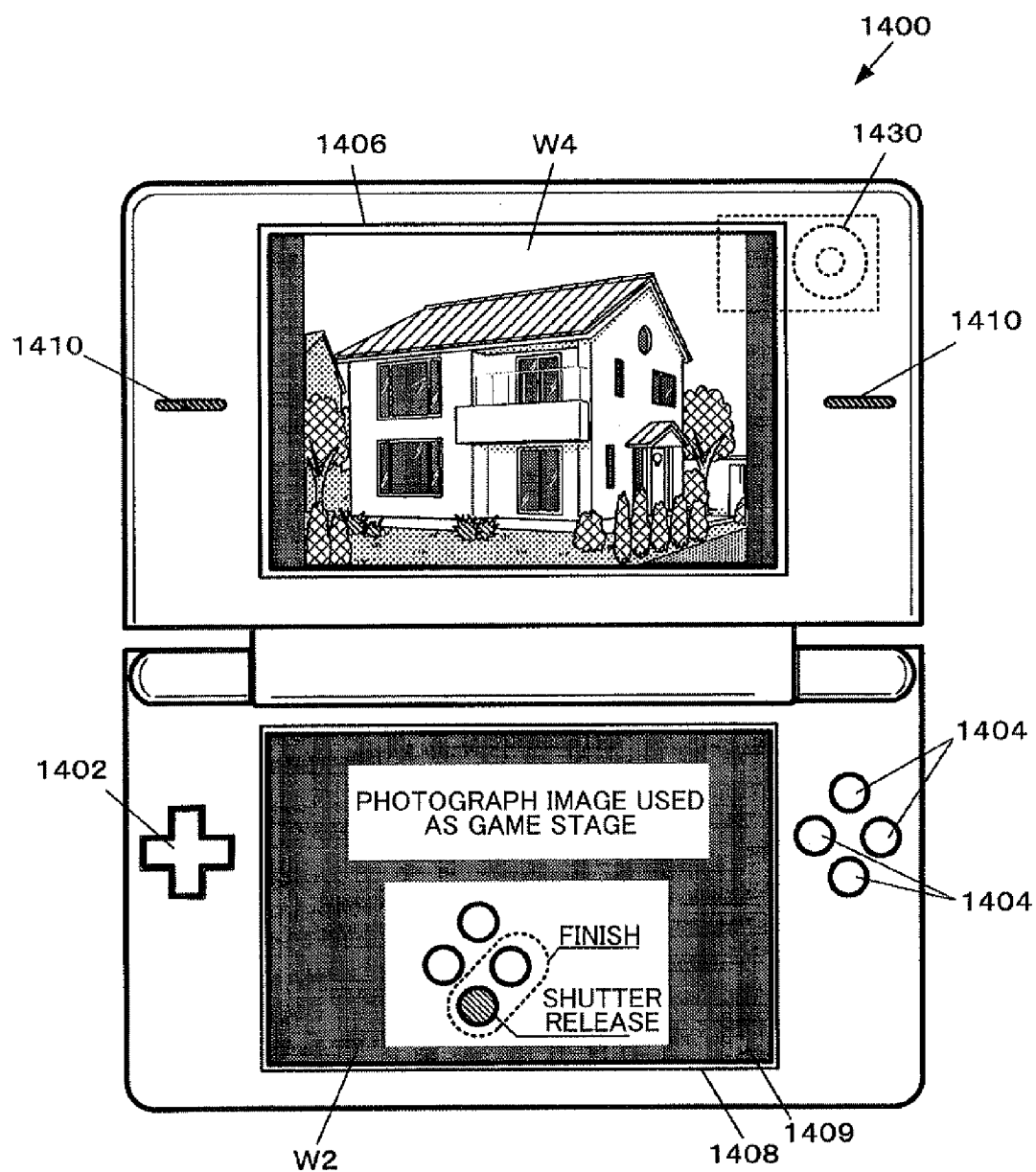
FIG. 2 is a view showing an example of a screen displayed when the player photographs an image used in a game.

In the example shown in FIG. 2, a house is displayed within the live view image W4. A shutter release function is assigned to the lower switch among the button switches 1404 that are disposed in a diamond shape, and a photographing operation is terminated when the lower switch and the right switch are pressed simultaneously.

When the player has determined the photographing range while aiming the image sensor module 1430 at the desired photographing target, and performed a shutter release operation by pressing the lower button switch 1404, two-dimensional image data in a given format is generated in the same manner as in a known digital camera, and stored in a given folder of the memory card 1440. The player may photograph an image used as the game stage a plurality of times. The image thus photographed is referred to as "original two-dimensional image".

Note that the original two-dimensional image may be acquired by designating data or a folder stored in the memory card 1440, or downloaded from an external storage device through the wireless communication module 1412.

When the original two-dimensional image has been acquired, a point where the target character (i.e., "mole") of the whack-a-mole game appears is determined for each original two-dimensional image.

Figure 3:
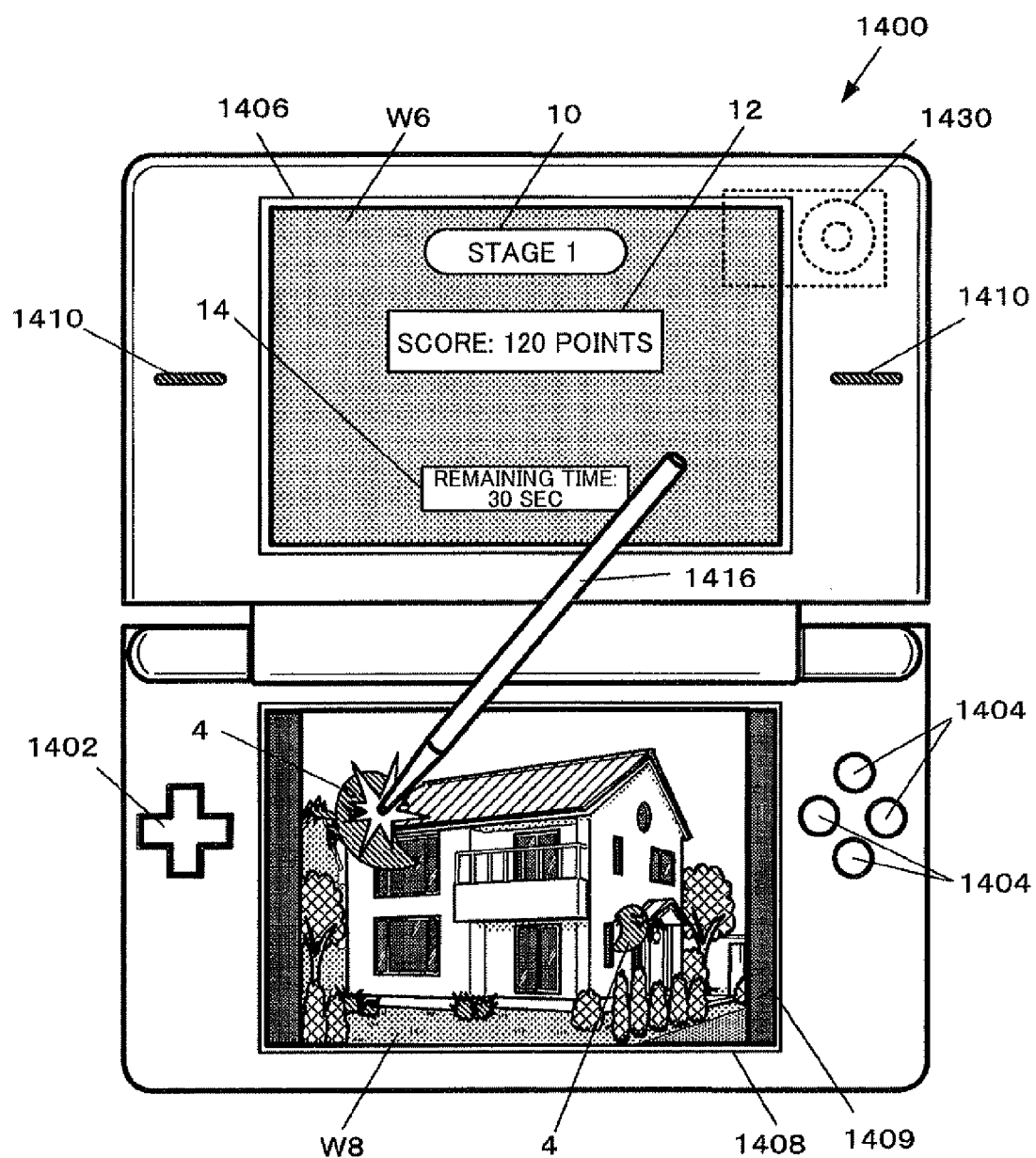
FIG. 3 is a view showing an example of a screen displayed during a game.

As shown in FIG. 3, a target character 4 is caused to appear or disappear from the image area selected from the original two-dimensional image (background), and the game process is controlled so that points are added to the score when the player has touched the target character 4 that has appeared in the image area using the stylus pen 1416 or the like.

In this embodiment, the first liquid crystal display 1406 displays an information display screen W6 that includes a current game stage number 10, a current score 12, and a residual play time 14 in the current game stage, and the second liquid crystal display 1408 displays a game screen W8. The game screen W8 is controlled so that the target character 4 appears in a feature image area (i.e., the quadrangular window of the house in the example shown in FIG. 3) of the original two-dimensional image (background) that satisfies a given feature condition.

Feature image area extraction principle

FIGS. 4 to 7 are views illustrative of the feature image area extraction principle.

Figure 4:
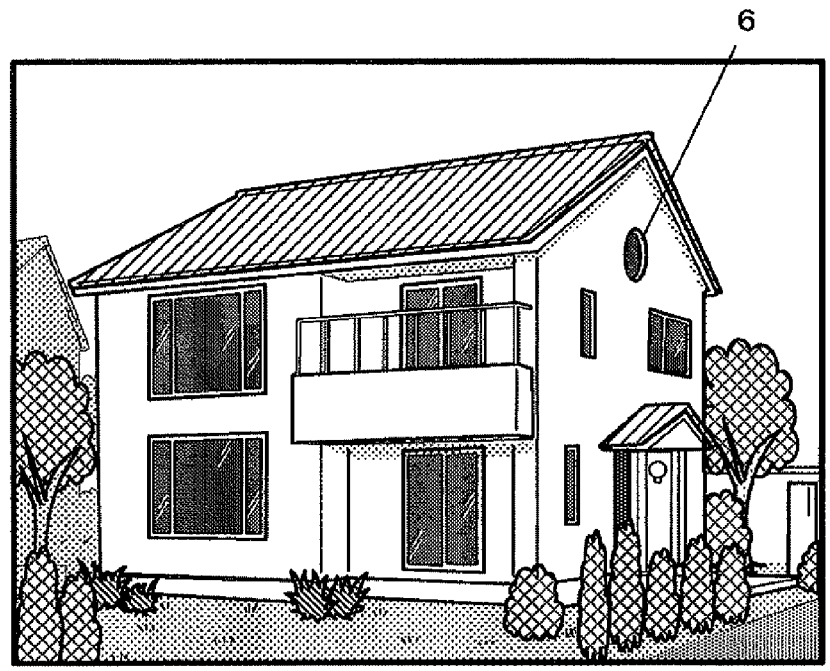
FIG. 4 is a view showing an example of a photographed original two-dimensional image.
Figure 5:
FIG. 5 is a view showing an example of an approximate outline extracted from an original two-dimensional image.

FIG. 4 is a view showing an original two-dimensional image that has been photographed (acquired) before starting the game. The original two-dimensional image is subjected to an outline extraction process. An approximate outline of each section (e.g., roof, window, wall, and garden tree) is obtained by the outline extraction process (see solid lines in FIG. 5).

An outline that satisfies a given feature condition is extracted from the approximate outlines obtained by the outline extraction process.

Various parameters obtained by processing the original two-dimensional image may be appropriately set as the feature condition. Examples of the feature condition include (1) the shape of the approximate outline (e.g., triangle, quadrangle (whether the quadrangle is a diamond, trapezoid, rectangle, square, etc. may be determined), star, ellipse, or crisscross), (2) the statistical color of the area enclosed by the approximate outline (e.g., a color that is statistically calculated from color information about pixels included in the area enclosed by the approximate outline (e.g., an average color or a color with the highest intensity), (3) the contrast between the area enclosed by the approximate outline and an area around the area enclosed by the approximate outline, (4) the relative relationship between the color of the area enclosed by the approximate outline and the color of an area around the area enclosed by the approximate outline (e.g., similarity of statistical color or complementary color), and the like.

In this embodiment, the target character 4 such as a ghost or a monster appears from a foreign space or a passage to a spiritual world. Therefore, a quadrangular approximate outline is extracted. For example, the window areas are extracted (see bold solid lines shown in FIG. 6). Broken lines indicate the approximate outlines that are not extracted.

A round window 6 positioned in the upper area (second floor) of the original two-dimensional image (see FIG. 4) is not extracted since the window 6 does not satisfy the feature condition according to this embodiment. Note that the round window 6 is also extracted when the feature condition is satisfied when the approximate outline is quadrangular or elliptical.

When a window includes a plurality of window panes (see FIG. 6), each window pane is extracted as the feature image area. If the photographing target house differs in shape or color arrangement, a wall provided with a window may also be extracted.

If the feature image areas are positioned close to each other, the target characters appear adjacently so that game playability may be impaired. If the feature image area is too large with respect to the entire screen, the player can easily touch the target character so that game playability may also be impaired. If the feature image area is too small with respect to the entire screen, the player may not be able to touch the target character so that the difficulty level of the game may unnecessarily increase.

In this embodiment, feature image areas suitable for game play are appropriately selected based on the positional relationship between the pre-selected feature image areas or the size of the pre-selected feature image areas with respect to the entire screen, and may be united, if necessary.

Figure 6:
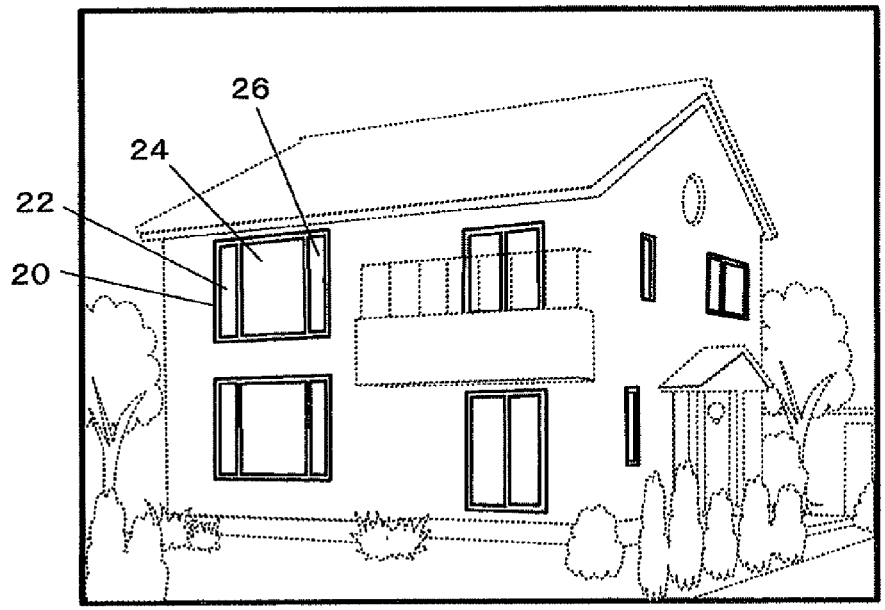
FIG. 6 is a view showing an example of an extracted feature image area.
Figure 7:
FIG. 7 is a view showing an example of a united feature image area.

Specifically, a feature image area 20 shown in FIG. 6 corresponds to the window frame, and feature image areas 22, 24, and 26 shown in FIG. 6 correspond to three window panes. Since the feature image area 20 and the feature image areas 22, 24, and 26 are determined to have a nested structure, and the feature image areas 22, 24, and 26 are determined to be adjacently situated, the feature image areas 20, 22, 24, and 26 are united to form a single feature image area 28 (see FIG. 7). This also applies to other feature image areas.

Specifically, when the center position of one feature image area is included within another feature image area, these feature image areas are determined to have a nested structure, for example. When the distance between the approximate outlines of feature image areas is shorter than a given adjacency determination reference value, these feature image areas are determined to be adjacently situated and need to be united.

The feature image areas having a nested structure are united so that the feature image area of which the center position is included within the other feature image area is united with the other feature image area. Note that the feature image areas having a nested structure may be united in an arbitrary manner.

The feature image areas that are adjacently situated are united to form a single feature image area that also includes an opening between the feature image areas. Note that only one of the feature image areas that are adjacently situated may be allowed to remain (i.e., other feature image areas may be excluded).

Appearance direction of target character

In this embodiment, the target character is caused to appear from the feature image area that has been thus extracted/united. In this case, an appearance direction appropriate for each feature image area is determined so that the appearance direction of the target character matches the three-dimensional relationship around the object displayed within the original two-dimensional image.

Taking the original two-dimensional image shown in FIG. 4 as an example, the target character is caused to appear from the inside of the house and move to the outside.

Specifically, the structure of the three-dimensional space photographed within the original two-dimensional image is calculated based on the original two-dimensional image, and an appearance direction vector Vc (two-dimensional vector) that matches the three-dimensional relationship between each feature image area is calculated. The structure of the three-dimensional space may be calculated by utilizing known technology that generates a three-dimensional image from a single two-dimensional image, or known technology that forms a three-dimensional model from a single two-dimensional image.

Figure 8:
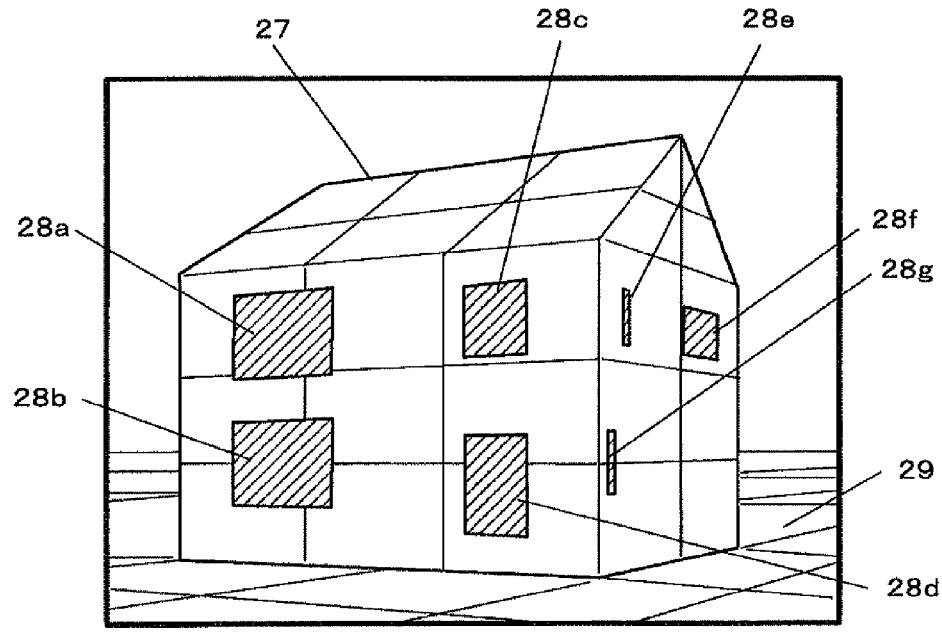
FIG. 8 is a view showing an example of automatically generating a three-dimensional model from an original two-dimensional image.

For example, a three-dimensional model shown in FIG. 8 is calculated from the original two-dimensional image shown in FIG. 4. FIG. 8 shows a three-dimensional model 27 of the house (main object) disposed on an earth's surface 29. In FIG. 8, the detailed structure of the three-dimensional model 27 of the house is omitted. A model (e.g., trees) that should be obtained (calculated) around the three-dimensional model 27 of the house is also omitted.

Figure 9:
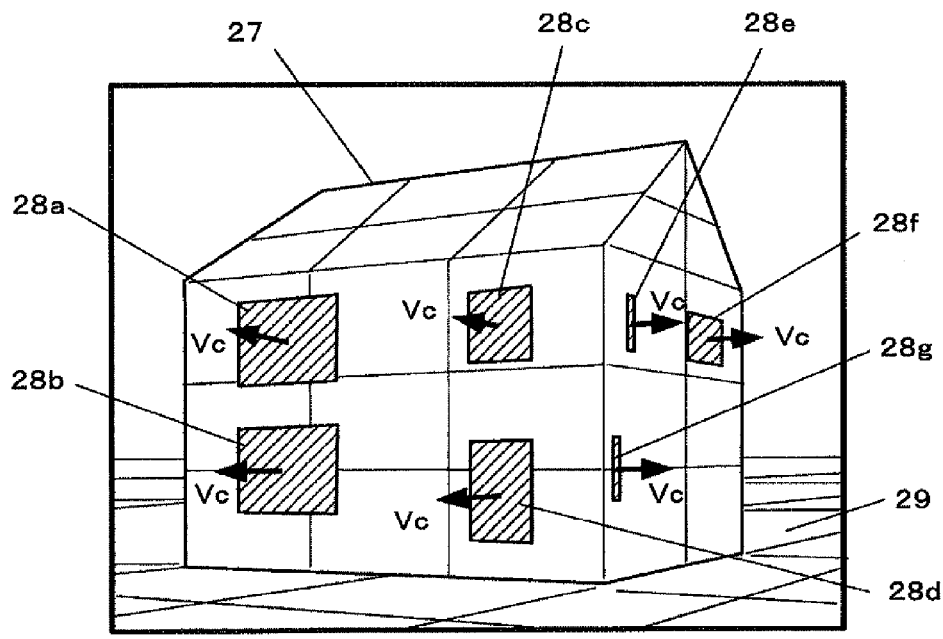
FIG. 9 is a view showing an example of a character appearance direction calculated for each feature image area based on a three-dimensional model.

The united feature image areas 28 (28a to 28g) are disposed on the side surface of the three-dimensional model 27 of the house. As shown in FIG. 9, the appearance direction vector Vc of each feature image area 28 is calculated as a projection vector obtained by projecting the normal vector of the side surface of the three-dimensional model 27 of the house onto the screen coordinates.

Figure 10:
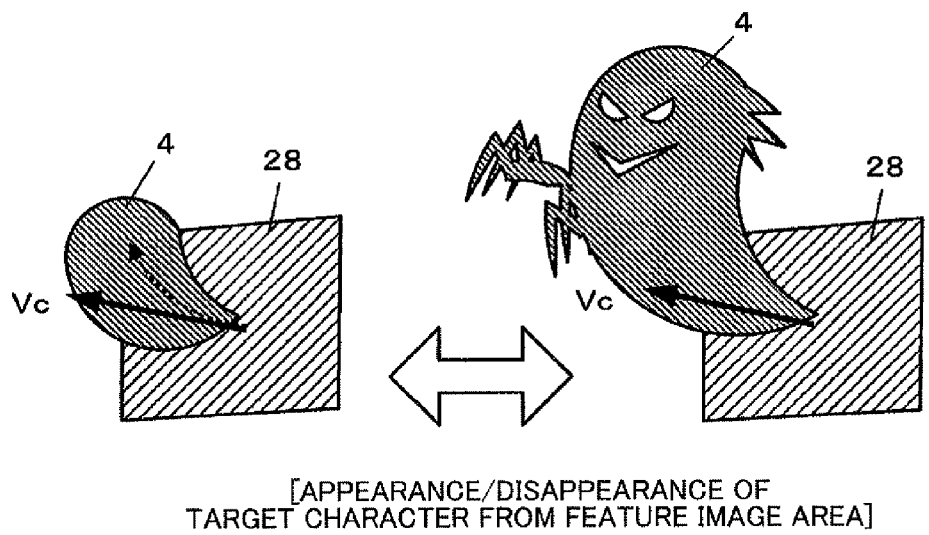
FIG. 10 is a view showing an example of a method that causes a character to appear from a feature image area.

As shown in FIG. 10, the target character 4 appears from the feature image area 28, expands in the direction indicated by the appearance direction vector Vc, and then disappears. The target character 4 basically appears from the center of the feature image area 28, for example. Note that the target character 4 may appear from an arbitrary position within the feature image area 28.

Figure 11:
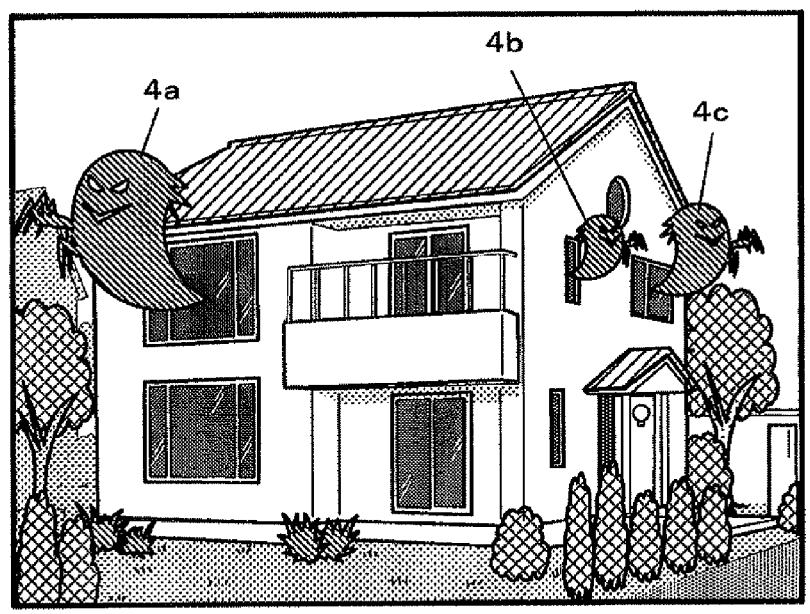
FIG. 11 is a view showing an example of a game screen in which a character is superimposed on a feature image area of an original two-dimensional image.

The size of the target character 4 is determined based on the size of the feature image area 28. Specifically, the size of the target character 4 is determined so that the size of the target character 4 increases as the size of the feature image area 28 (window) increases, as shown in FIG. 11.

The player can more easily touch the target character 4 as the size of the target character 4 increases so that the difficulty level of the game decreases. Therefore, the difficulty level (game stage) of the game is roughly determined based on the size and the number of extracted feature image areas 28.

When a plurality of original two-dimensional images are provided, the difficulty level of the game is estimated based on the size and the number of feature image areas 28, and the game stage numbers are sequentially assigned to the original two-dimensional images from the original two-dimensional image for which the estimated difficulty level of the game is lowest so that the difficulty level of the game gradually increases with the progress of the game.

Functional blocks

A functional configuration example that implements the above game is described below.

Figure 12:
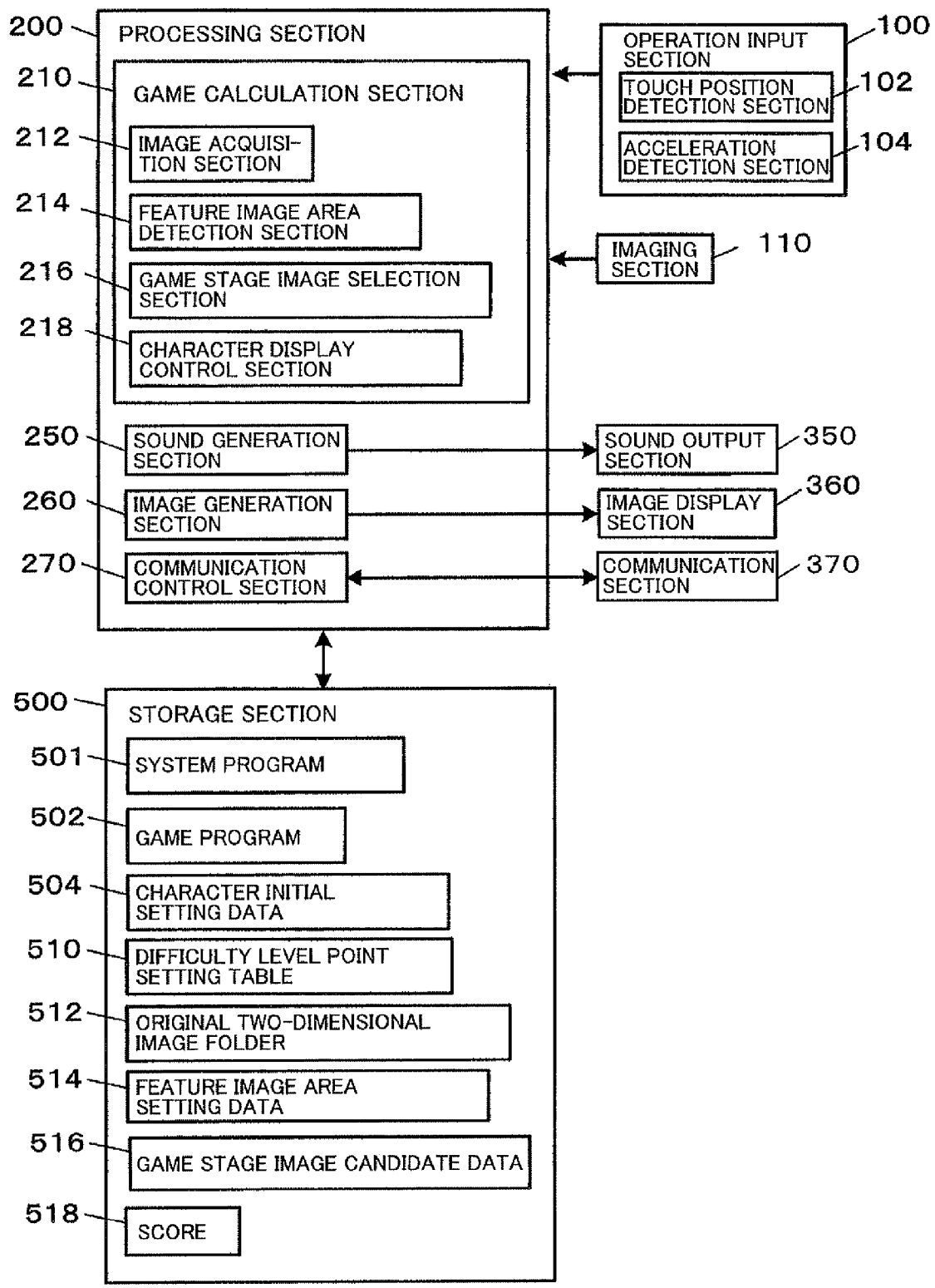
FIG. 12 is a functional block diagram showing a functional configuration example according to a first embodiment.

FIG. 12 is a functional block diagram showing an example of the functional configuration according to this embodiment. As shown in FIG. 12, the portable game device 1400 according to this embodiment includes an operation input section 100, an imaging section 110, a processing section 200, a sound output section 350, an image display section 360, a communication section 370, and a storage section 500.

The operation input section 100 outputs an operation input signal to the processing section 200 based on an operation input performed by the player. In this embodiment, the operation input section 100 includes a touch position detection section 102 and an acceleration detection section 104.

The operation input section 100 may be implemented by a button switch, a joystick, a touch pad, a trackball, a multi-axis acceleration sensor that has two or more detection axes, a single-axis acceleration sensor unit formed by combining acceleration sensors so that the detection axis direction differs, a multi-direction tilt sensor that has two or more detection directions, a single-direction tilt sensor unit formed by combining tilt sensors so that the detection direction differs, and the like. The arrow key 1402 and the button switches 1404 shown in FIG. 1 correspond to the operation input section 100.

The touch position detection section 102 is a device that detects a touch position within a display screen. The touch panels 1407 and 1409 shown in FIG. 1 correspond to the touch position detection section 102.

The triaxial acceleration sensor 1422 shown in FIG. 1 corresponds to the acceleration detection section 104.

The imaging section 110 converts light received from the photographing target into an electrical signal to generate digital image data, and outputs the digital image data to the processing section 200. The imaging section 110 may be implemented by a lens, a mechanical shutter, a shutter driver, a photoelectric conversion element (e.g., CCD image sensor module or CMOS image sensor module), a digital signal processor (DSP) that reads the amount of charge from a photoelectric conversion element and generates image data, an IC memory, and the like. The image sensor module 1430 shown in FIG. 1 corresponds to the imaging section 110.

The processing section 200 is implemented by a microprocessor (e.g., CPU and GPU), an application-specific integrated circuit (ASIC), an IC memory, and the like. The processing section 200 exchanges data with each functional section of the portable game device 1400 including the operation input section 100 and the storage section 500. The processing section 200 controls the operation of the portable game device 1400 by performing various calculations based on a given program, data, and the operation input signal from the operation input section 100. The control unit 1450 shown in FIG. 1 corresponds to the processing section 200. The processing section 200 according to this embodiment includes a game calculation section 210, a sound generation section 250, an image generation section 260, and a communication control section 270.

The game calculation section 210 executes a game process. In this embodiment, the game calculation section 210 includes an image acquisition section 212, a feature image area detection section 214, a game stage image selection section 216, and a character appearance display control section 218.

The image acquisition section 212 executes a process that acquires an original two-dimensional image used as a game stage background image. In this embodiment, the image acquisition section 212 causes the image display section 360 to display the photographing screen W2 (see FIG. 2) to prompt the player to photograph an image, and assigns the shutter release operation to the operation input section 100. The image acquisition section 212 stores image data of an image obtained by the imaging section 110 at the shutter release operation timing in the storage section 500 as the original two-dimensional image.

Although this embodiment employs a configuration in which the image acquisition section 212 acquires an image photographed by the imaging section 110, image data may be downloaded from an external device through the communication section 370. Alternatively, image data stored in advance in the storage section 500 may be read and selected by the player.

The feature image area detection section 214 detects an area (feature image area) that satisfies a given feature condition from the original two-dimensional image. The feature image area detection section 214 unites the feature image areas that have been detected and satisfy a given adjacency condition or nested structure condition, and calculates the character appearance direction for each united feature image area (see FIGS. 5 to 9).

In this embodiment, the feature condition is satisfied when the approximate outline is quadrangular. Note that the feature condition may be satisfied when the approximate outline has another shape, or a condition based on the color of the area enclosed by the approximate outline may be set alternatively or additionally.

The game stage image selection section 216 selects an image suitable as the game stage based on the feature image areas detected by the feature image area detection section 214 when a plurality of original two-dimensional images have been acquired by the image acquisition section 212, and assigns the game stage number to the selected image based on the feature image area detection results (e.g., number, size, location, and color).

The character appearance display control section 218 causes the target character 4 to appear or disappear from the feature image area (superimposition display control) (see FIGS. 10 and 11). The character appearance display control section 218 determines the size of the target character 4 that appears based on the size of the feature image area, and determines the type and the number of characters based on the color (e.g., statistical color) of the area enclosed by the feature image area.

The sound generation section 250 is implemented by a processor (e.g., digital signal processor (DSP) or sound synthesis IC) and an audio codec that can reproduce a sound file, for example. The sound generation section 250 generates a sound signal of a game-related effect sound, background music (BGM), or an operation sound based on the processing results of the game calculation section 210, and outputs the generated sound signal to the sound output section 350.

The sound output section 350 is implemented by a device that outputs sound such as effect sound or BGM based on the sound signal input from the sound generation section 250. The speaker 1410 shown in FIG. 1 corresponds to the sound output section 350.

The image generation section 260 is implemented by a processor (e.g., graphics processing unit (GPU) or a digital signal processor (DSP)), a video signal IC, a program (e.g., video codec), a drawing frame IC memory (e.g., frame buffer), and the like. The image generation section 260 generates a game image every frame (e.g., 1/60th of a second) based on the processing results of the game calculation section 210, and outputs an image signal of the generated game image to the image display section 360.

The image display section 360 displays a game image based on the image signal input from the image generation section 260. The image display section 360 may be implemented by an image display device such as a flat panel display, a cathode-ray tube (CRT), a projector, or a head mount display. The first liquid crystal display 1406 and the second liquid crystal display 1408 shown in FIG. 1 correspond to the image display section 360.

The communication control section 270 performs a data communication process to implement data exchange with an external device through the communication section 370.

The communication section 370 connects to the communication channel 1 to implement communication. The communication section 370 is implemented by a transceiver, a modem, a terminal adapter (TA), a jack for a communication cable, a control circuit, and the like. The wireless communication module 1412 shown in FIG. 1 corresponds to the communication section 370.

The storage section 500 stores a system program that implements a function for causing the processing section 200 to control the portable game device 1400, a game program and data necessary for causing the processing section 200 to execute the game, and the like. The storage section 500 is used as a work area for the processing section 200, and temporarily stores the results of calculations performed by the processing section 200 based on a program, data input from the operation section 100, and the like. The function of the storage section 500 is implemented by an IC memory (e.g., RAM or ROM), a magnetic disk (e.g., hard disk), an optical disk (e.g., CD-ROM or DVD), or the like. The IC memory included in the control unit 1450 and the memory card 1440 shown in FIG. 1 correspond to the storage section 500.

In this embodiment, the storage section 500 stores a system program 501 and a game program 502. The system program 501 implements an embedded system that implements the basic function of the portable game device 1400, and includes various types of firmware that allows application software to call and utilize each functional section. For example, the system program 501 implements a digital camera function utilizing the imaging section 110. The game program 502 is application software that is read and executed by the processing section 200 so that the processing section 200 implements the function of the game calculation section 210.

The storage section 500 also stores character initial setting data 504 and a difficulty level point setting table (TBL) 510 that are provided in advance.

The storage section 500 also stores an original two-dimensional image folder 512, feature image area setting data 514, game stage image candidate data 516, and a score 518 that are appropriately generated or rewritten during the game preparation or the game process.

The storage section 500 also appropriately stores data (e.g., timer value and counter value) that is required for the game process.

Initial setting information about the character that is superimposed on the feature image area is stored as the character initial setting data 504. As shown in FIG. 13, a character type 504a, a selection condition 504b, and points 504c (added to the score of the player when the player has touched the character) are linked and stored as the character initial setting data 504, for example. Examples of the parameters of the selection condition 504b include the color attribute of the feature image area (i.e., the system of the representative color of the feature image area that is statistically calculated), the external shape of the feature image area, the size (%) of the feature image area with respect to the entire image, and the like. Different types of target characters CR1 to CR4 can be set based on the parameters of the selection condition 504b.

Specifically, the target characters CR1 and CR2 are designed using a color similar to the color attribute of the selection condition 504b. In this case, the player is given an impression that the target character is born from the feature image area. The target characters CR3 and CR4 are selected when the size of the feature image area is 5% or less with respect to the entire image, and designed using a color complementary to the color of the feature image area, but differ in design due to the difference in shape of the feature image area.

The number of characters of the character type 594a that are caused to appear may be linked to the character type 504a, or the number of characters that are caused to appear may be set instead of the character type 504a. In the latter case, the number of identical characters that are caused to appear changes depending on the selection condition 504b.

The character initial setting data 504 includes character size setting data 504d. The character size setting data 504d defines the factor by which the target character is scaled with respect to the initial setting size (100%). In the example shown in FIG. 13, the size of the target character is set to 10% of the initial setting size when the size of the feature image area is less than 5% of the size of the entire original two-dimensional image. The size of the target character increases as the size of the feature image area with respect to the size of the entire original two-dimensional image increases when the size of the feature image area is 5 to 20% of the size of the entire original two-dimensional image. The size of the target character is fixed to the initial setting size when the size of the feature image area exceeds 20% of the size of the entire original two-dimensional image to prevent a situation in which the difficulty level of the game unnecessarily decreases as a result of displaying an improperly large target character.

The difficulty level point setting TBL 510 defines a basal value of points that indicate the difficulty level of the game that is estimated when using the original two-dimensional image as the game stage. The difficulty level points are used as a condition for excluding an image that is not appropriate as the game stage or a condition for setting the order of images used as the game stage when a plurality of images are stored in the original two-dimensional image folder 512.

As shown in FIG. 14, the difficulty level point setting TBL 510 includes a first table that stores a feature image area number condition 510a and appearance position points 510b, and a second table that stores a feature image area size condition 510c and appearance size points 510d, for example. The first table according to this embodiment is defined so that higher points are added as the number of (united) feature image areas included in the target original two-dimensional image increases, since the difficulty level of the game increases as the number of target characters that appear within the screen increases. The second table is defined so that higher points are added as the size of the feature image area included in the target original two-dimensional image with respect to the screen size decreases since the difficulty level of the game increases as the size of the target character that appears within the screen decreases.

The feature image area setting data 514 is provided corresponding to each original two-dimensional image, and stores information about the feature image area included in each original two-dimensional image. As shown in FIG. 15, the feature image area setting data 514 includes an image data name 514a, for example. A label 514b that is set corresponding to each feature image area, area identification data 514c, an appearance direction vector 514d, a color attribute 514e, a feature image area size 514f, a character type 514g, and a character size 514h are stored as the feature image area setting data 514. Note that other parameters may also be linked to the label 514b.

The label 514b is information that identifies the feature image area.

The area identification data 514c is information that specifies the feature image area. For example, information about the approximate outline that encloses the feature image area, the coordinates of all dots included in the feature image area, and the coordinates of a representative dot (e.g., center position) included in the feature image area may be stored as the area identification data 514c.

The system of the representative color of all dots (or selected dots) included in the feature image area that is statistically calculated and determined based on a given standard is stored as the color attribute 514e. For example, the system of the representative color is a rough attribute (e.g., red, blue, or yellow).

The size (%) of the feature image area with respect to the size of the entire screen (100%) is stored as the feature image area size 514f.

The character type that is assigned to the feature image area based on the character initial setting data 504 is stored as the character type 514g.

The size (initial setting size=100%) of the target character that appears from the feature image area is stored as the character size 514h, the size of the target character being determined based on the character size setting data 504d of the character initial setting data 504.

Information about the original two-dimensional image (image used as the game stage image) that is selected by the game stage image selection section 216 from the images stored in the original two-dimensional image folder 512 is stored as the game stage image candidate data 516.

As shown in FIG. 16, an image data name 516a, appearance position points 516b and appearance size points 516c determined based on the difficulty level point setting TBL 510, difficulty level points 516d (i.e., the sum of the appearance position points 516b and the appearance size points 516c), and a game stage number 516e determined by the game stage image selection section 216 based on the difficulty level point 516d are stored as the game stage image candidate data 516.

Process Flow

The flow of a process according to this embodiment is described below. A series of processes described below is implemented by causing the processing section 200 to read and execute the game program 502.

Figure 17:
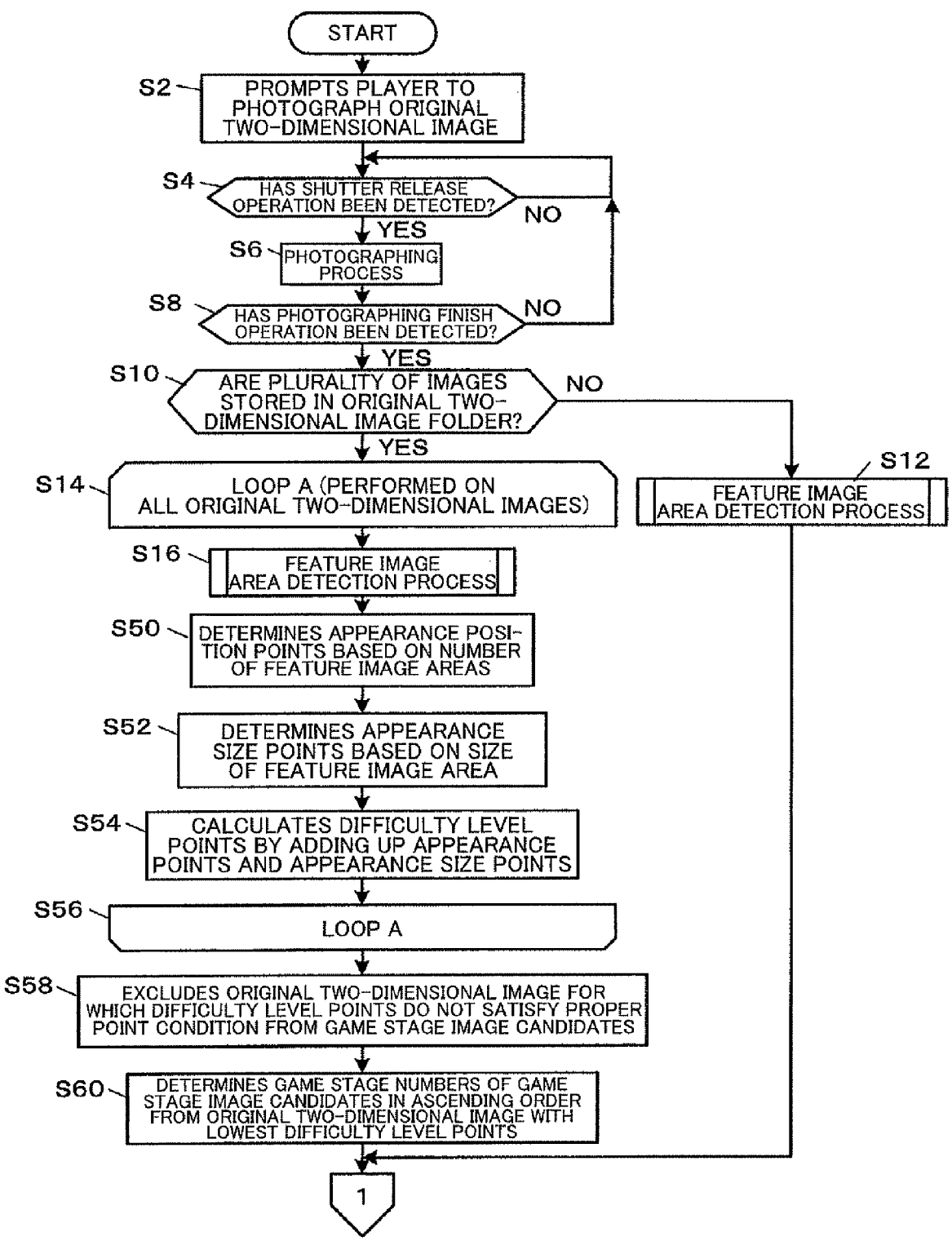
FIG. 17 is a flowchart illustrative of the flow of a main process.
Figure 18:
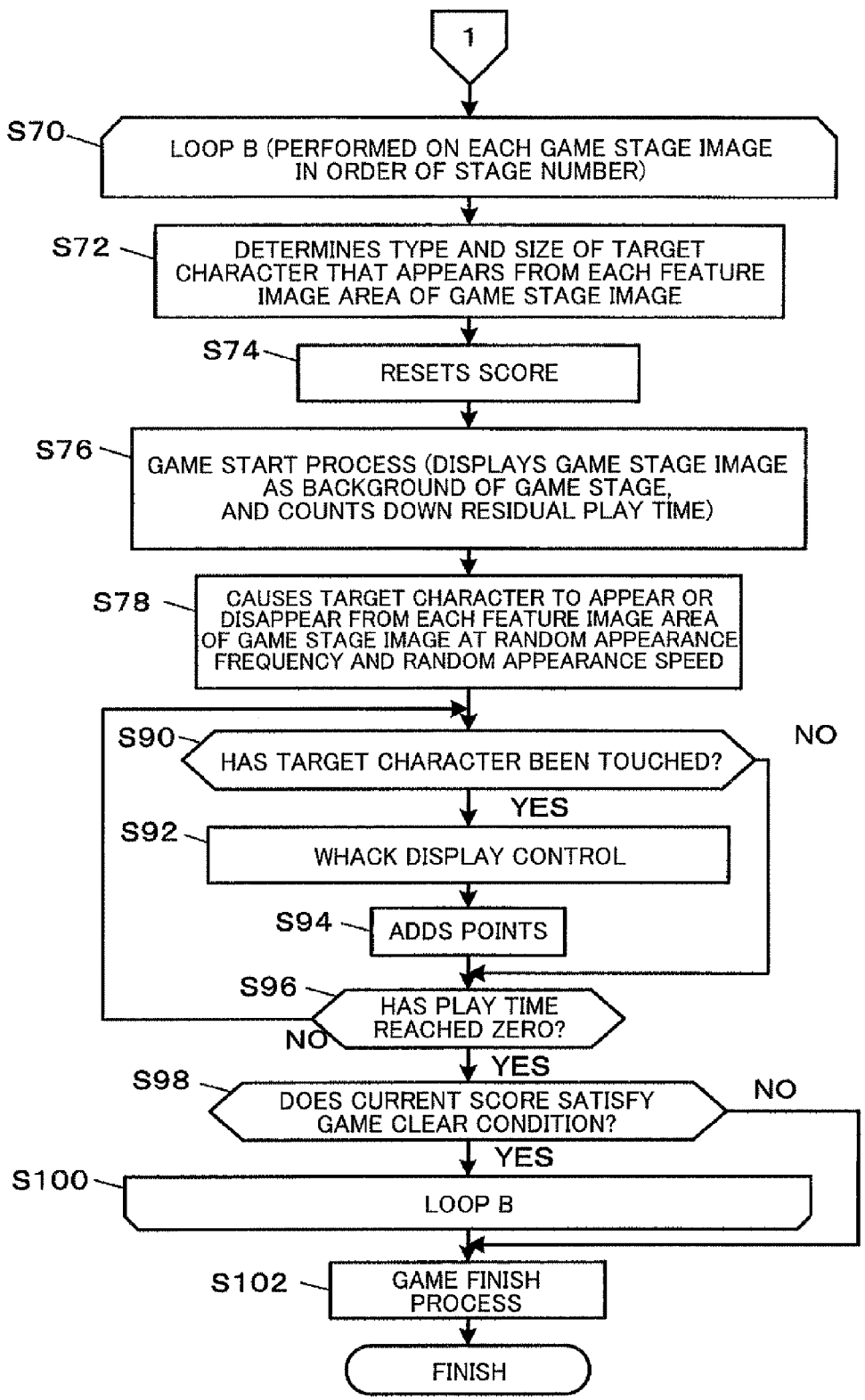
FIG. 18 is a flowchart illustrative of the flow of a main process.

FIGS. 17 and 18 are flowcharts illustrative of the flow of the main process. In order to acquire the original two-dimensional image, the processing section 200 causes the first liquid crystal display 1406 to display a live view image obtained by the image sensor 1430, and causes the second liquid crystal display 1408 to display the operation guide screen W2 to prompt the player to photograph an image (step S2). When the processing section 200 has detected that the player has performed a photographing operation according to a given photographing procedure (YES in step S4), the processing section 200 executes a photographing process, and stores the photographed image in the original two-dimensional image folder 512 (step S6). The processing section 200 repeats the steps S4 and S6 until a photographing finish operation is detected (NO in step S8).

When acquiring an image data from an external device through the communication section 370, the steps S2 to S6 may be replaced by a step of connecting to a given external device, a step of allowing the player to select an image from image data stored in the external device, and a step of downloading the image selected by the player and storing the downloaded image in the original two-dimensional image folder 512. When image data has been stored in the storage section 500, the steps S2 to S6 may be replaced by a step of allowing the player to select an image from the image data stored in the storage section 500.

When the processing section 200 has detected that the player has performed the photographing finish operation (YES in step S8), and a single image is stored in the original two-dimensional image folder 512 (NO in step S10), the processing section 200 executes a feature image area detection process on the image stored in the original two-dimensional image folder 512 (step S12).

Figure 19:
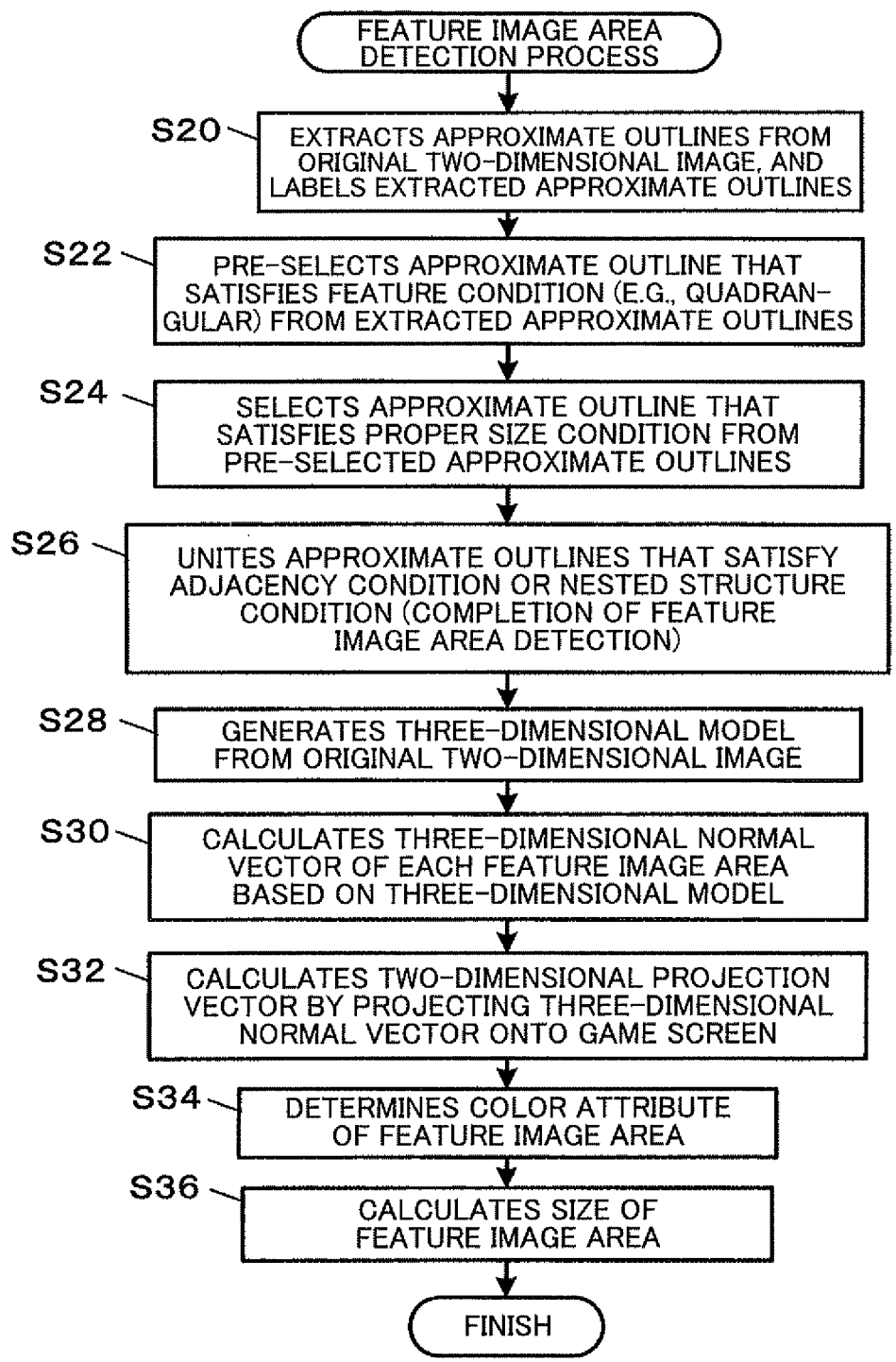
FIG. 19 is a flowchart illustrative of the flow of a feature image area detection process according to the first embodiment.

FIG. 19 is a flowchart illustrative of the flow of the feature image area detection process according to this embodiment. In the feature image area detection process, the processing section 200 extracts approximate outlines from the target original two-dimensional image, and labels the extracted approximate outlines (step S20).

The processing section 200 pre-selects an approximate outline that satisfies a given feature condition from the extracted approximate outlines (step S22). In this embodiment, the processing section 200 selects a quadrangular approximate outline.

The processing section 200 then selects an approximate outline that satisfies a given proper size condition from the pre-selected approximate outlines (step S24). The term "proper size condition" used herein refers to a condition for excluding an area (very small area) that is enclosed by the approximate outline and is determined to be too small to cause the target character to appear and allow the player to touch the target character in a whack-a-mole manner, and an area (very large area) that is enclosed by the approximate outline and is determined to occupy a large area of the game screen. The proper size condition is appropriately set taking account of the screen size and the resolution of the portable game device 1400, the target age group, and the like. Specifically, the processing section 200 excludes the very small area and the very large area in the step S24.

When the processing section 200 has selected an approximate outline that satisfies the proper size condition, the processing section 200 extracts approximate outlines that satisfy a given adjacency condition (e.g., the feature image areas 22, 24, and 26 shown in FIG. 6) and approximate outlines that have a nested structure (e.g., the feature image areas 20, 22, 24, and 26 shown in FIG. 6) from the selected approximate outlines, and unites the extracted approximate outlines (step S26). The area that is enclosed by the approximate outline and has been thus united is the final feature image area from which the target character is caused to appear. The feature image area setting data 514 that is linked to the target original two-dimensional image is generated, and the label 514*b* and the area identification data 514*c* are stored in the storage section 500.

In order to calculate the character appearance direction corresponding to each feature image area, the processing section 200 acquires the three-dimensional structure of the object and the space around the object from the target original two-dimensional image (step S28). In this embodiment, the three-dimensional structure is acquired by utilizing known technology that automatically generates a three-dimensional image from a two-dimensional image.

When the processing section 200 has generated the three-dimensional model, the processing section 200 calculates the three-dimensional normal vector of each feature image area in the three-dimensional structure of the object and the space around the object based on the three-dimensional model (step S30). The processing section 200 calculates a two-dimensional projection vector obtained by projecting each three-dimensional normal vector onto the game screen, and determines the two-dimensional projection vector to be the character appearance direction vector Vc in each feature image area (step S32).

The processing section 200 then determines the color attribute of each feature image area (step S34). Specifically, the processing section 200 calculates the average color of the dots included in the feature image area, and determines the hue (e.g., R, G, B, C, M, Y, or K) that corresponds to the average color. The processing section 200 then calculates the size of each feature image area (step S36), and finishes the feature image area detection process.

Again referring to the flowchart shown in FIG. 17, when a plurality of images are stored in the original two-dimensional image folder 512 (YES in step S10), the processing section 200 executes a loop A process on each image (steps S14 to S56).

In the loop A process, the processing section 200 executes the feature image area detection process on the target original two-dimensional image (step S16). The processing section 200 refers to the difficulty level point setting TBL 510, and determines the appearance position points based on the number of feature image areas detected in the step S16 (step S50). The processing section 200 determines the appearance size points of each feature image area detected in the step S16 based on the size of each feature image area (step S52).

The processing section 200 calculates the difficulty level points of the target original two-dimensional image by adding up the appearance position points and the appearance size points (step S54), and finishes the loop A process. The points calculated by the loop A process are stored as the game stage image candidate data 516 that is generated in the storage section 500 corresponding to each original two-dimensional image.

When the processing section 200 has executed the loop A process on each original two-dimensional image, the processing section 200 excludes the original two-dimensional image for which the difficulty level points do not satisfy a proper point condition (i.e., the difficulty level is too low or too high) from the game stage image candidates (step S58). Specifically, the processing section 200 deletes the original two-dimensional image for which the difficulty level points do not satisfy a proper point condition from the game stage image candidate data 516.

The processing section 200 determines the game stage numbers 516*e* of the remaining game stage image candidate original two-dimensional images in an ascending order from the original two-dimensional image with the lowest difficulty level points (step S60). The original two-dimensional image is thus identified as the game stage image.

Again referring to the flowchart shown in FIG. 18, the processing section 200 executes a loop B process on each game stage image in an ascending order of the game stage number 516*e* to implement a whack-a-mole game (steps S70 to S100).

In the loop B process, the processing section 200 refers to the character initial setting data 504, determines the type and the size of the target character that appears from each feature image area of the target game stage image, and registers the type and the size of the target character as the character type 514*g* and the character size 514*h* of the corresponding feature image area setting data 514 (see FIG. 15) (step S72).

The processing section 200 then resets the score 518 (step S74), and executes a game start process (step S76). The original two-dimensional image (target game stage image) is displayed as the game stage background image, and the residual play time in each game stage is counted down.

When the game has started, the processing section 200 causes the target character to appear or disappear from each feature image area of the target game stage image at a random appearance frequency and a random appearance speed (step S78). In this case, the type and the size of the target character that appears from each feature image area are determined based on the character type 514*g* and the character size 514*h* of the feature image area setting data 514 corresponding to the target game stage image.

When the position coordinates detected by the touch position detection section 102 indicate the target character that appears from the feature image area (i.e., the player has touched the target character that appears from the feature image area) (YES in step S90), the processing section 200 executes a whack display control process (e.g., the target character that has been touched by the player disappears) (step S92), refers to the character initial setting data 504 (see FIG. 13), and adds the points 504c linked to the character type 504a of the target character that has been touched by the player to the score of the player (step S94).

The processing section 200 then determines whether or not the residual play time has reached zero. When the residual play time has not reached zero (NO in step S96), the processing section 200 returns to the step S90 (i.e., continues the game process). When the residual play time has reached zero (YES in step S96), the processing section 200 determines whether or not the current score 518 satisfies a given game clear condition (step S98).

When the current score 518 satisfies the game clear condition (YES in step S98), the processing section 200 returns to the step S70, and executes the loop B process on the next game stage image. Specifically, the processing section 200 similarly executes the whack-a-mole game in the next game stage. When the processing section 200 has executed the loop B process on all of the game stage images, the processing section 200 executes a given game finish process (step S102), and finishes the series of processes.

When the current score 518 does not satisfy the game clear condition (NO in step S98), the processing section 200 executes the game finish process (step S102), and finishes the series of game processes.

According to this embodiment, it is possible to implement a game in which the target character appears from (is superimposed on) each area that has a common feature (feature image area) in the actually photographed original two-dimensional image.

Since the player can photograph the original two-dimensional image, an arbitrary image (e.g., home, commuting road, school road, office, school, or personal belongings) can be used as the game stage. Therefore, the player can enjoy a novel game in which the character appears from a familiar view.

The original two-dimensional image is not directly used as the background of the game screen, but the feature image areas that have a common feature are automatically selected, and an image appropriate for the game is automatically selected based on the number and the size of feature image areas. Therefore, since it suffices that the player merely photograph a favorite object, the player can easily and fully enjoy the game.

When a plurality of original two-dimensional images are provided, the game stage numbers can be assigned to the original two-dimensional images while automatically estimating the difficulty level of the game based on the feature image area. Therefore, the total game playability whereby the difficulty level of the game gradually increases each time the game stage is cleared can be implemented in the same manner as a known action game.

In the feature image area detection process according to this embodiment, approximate outlines are pre-selected only once based on a given feature condition. Note that approximate outlines may be pre-selected a plurality of times.

For example, approximate outlines may be pre-selected based on a first feature condition "quadrangular approximate outline". When the number of pre-selected approximate outlines is not sufficient for the game, approximate outlines may be pre-selected based on a second feature condition "elliptical approximate outline". If the number of pre-selected elliptical approximate outlines is sufficient for the game, only the elliptical approximate outlines may be subjected to the subsequent process (i.e., two-stage configuration). Note that a three or higher-stage configuration may be employed by further providing a feature condition. Such a multi-stage configuration enables various objects to be utilized. Therefore, various game stages can be implemented even if the player merely photographs the object without taking account of the shape etc. of the object.

In this embodiment, a still image is used as the original two-dimensional image. Note that one frame of a video may also be used as the original two-dimensional image. In this case, the feature image area detection process is executed on each frame of a video corresponding to the game play time to obtain a game stage image corresponding to one frame to implement a whack-a-mole game using a video as the background.

Second Embodiment

A second embodiment to which the invention is applied is described below. This embodiment is basically the same as the first embodiment, but differs from the first embodiment in that a portable telephone that can execute application software is used as the game device, and the player performs an operation input using a dial key. The elements described in connection with the first embodiment are indicated by identical symbols. Description of these elements is omitted. The following description focuses on the differences from the first embodiment.

Figure 20:
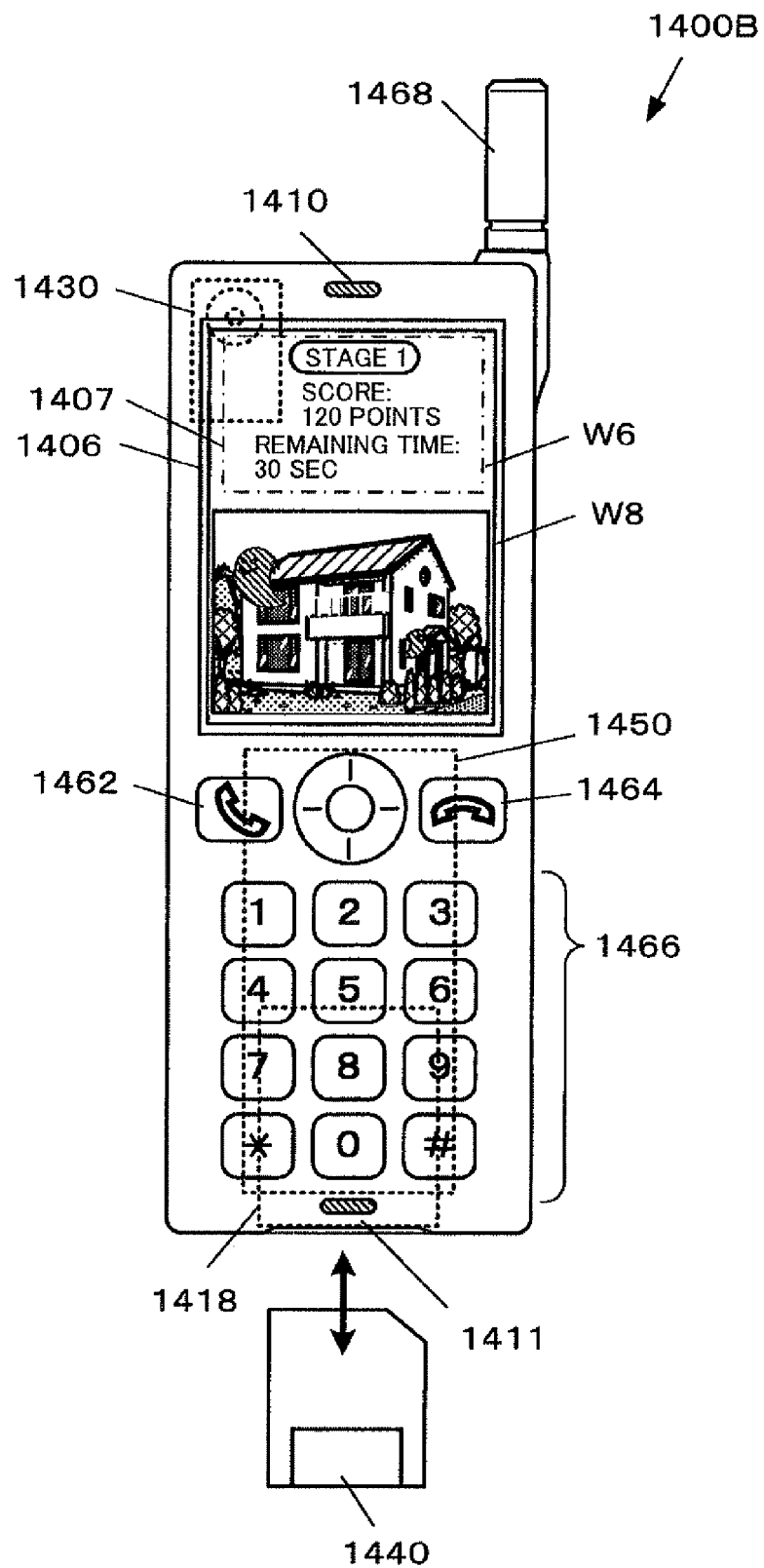
FIG. 20 is a view showing a configuration example of a game device according to a second embodiment.

FIG. 20 is a front external view showing a configuration example of a game device according to this embodiment. The game device according to this embodiment is a portable telephone 1400B that can execute application software. The portable telephone 1400B includes a speaker 1410, a microphone 1411, a telephone call start button 1462, a telephone call finish button 1464, a dial key group 1466, and a wireless communication antenna 1468. The portable telephone 1400B functions as a wireless telephone that utilizes wireless communication. The portable telephone 1400B can read application software stored in a memory card 1440 through a memory card reader 1418, and execute the application software read from the memory card 1440. The portable telephone 1400B according to this embodiment executes a game program as the application software.

A game operation is input using the dial key group 1466 since it is difficult to quickly input a game operation using a small touch panel 1407 provided on a first liquid crystal display 1406 of the portable telephone.

As shown in FIG. 21 (schematic view illustrative of an operation input method according to this embodiment), the game screen is divided into nine (3×3) areas (AR1 to AR9), and these areas are respectively assigned to the keys "1" to "9" of the dial key group 1466. The relative positional relationship among the areas corresponds to the relative positional relationship among the keys "1" to "9". The player operates one of the keys "1" to "9" that corresponds to the area in which a target character 4 appears instead of touching the target character 4. In the example shown in FIG. 21, when the player attacks the target character 4 that appears on the right of the screen, the player operates the dial key "6" that corresponds to the sixth area AR6.

Figure 22:
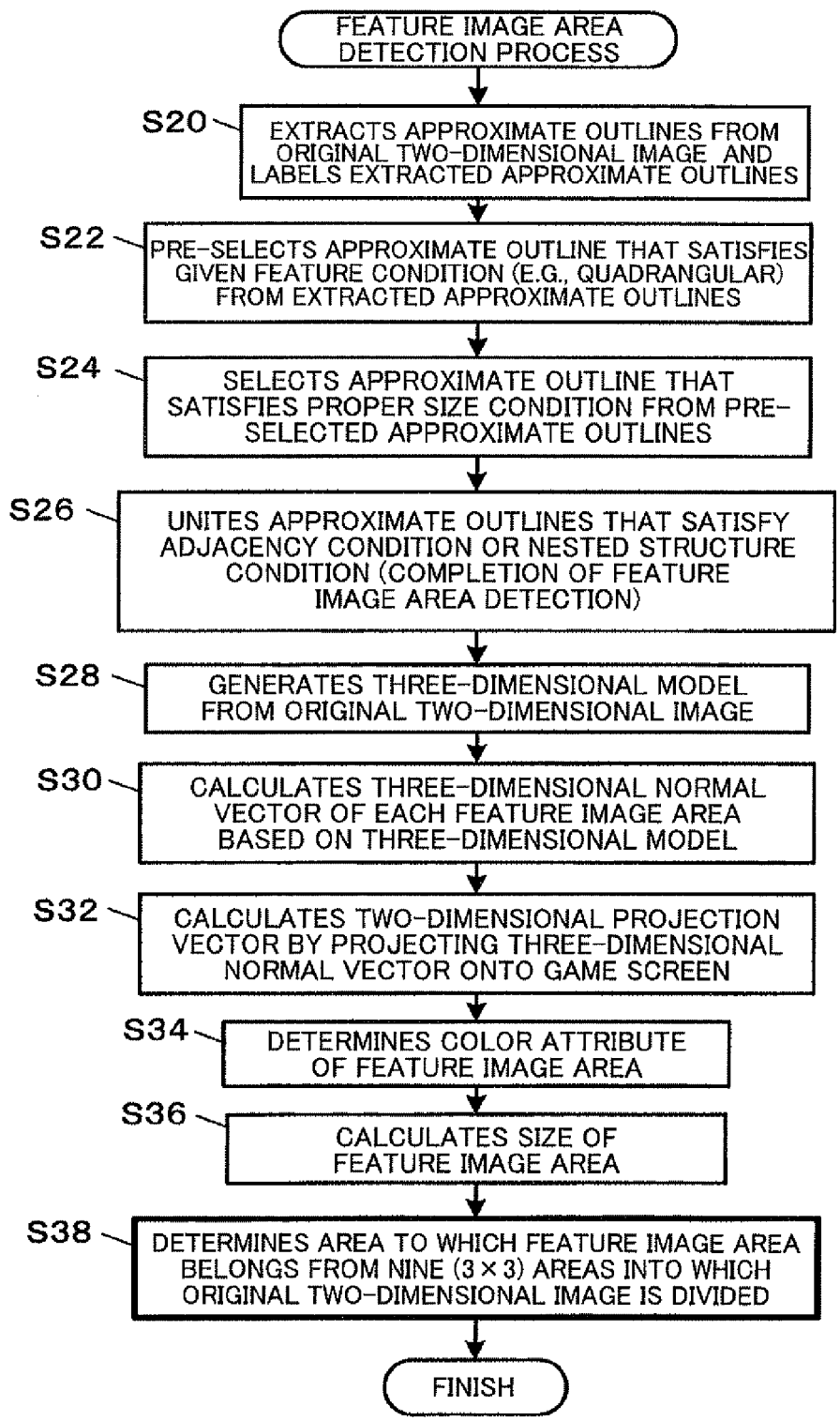
FIG. 22 is a flowchart illustrative of the flow of a feature image area detection process according to the second embodiment.

The functional configuration and the process flow according to this embodiment are basically the same as those of the first embodiment. As shown in FIG. 22, however, an area to which each feature image area belongs is determined from the nine (3×3) areas into which the original two-dimensional image is divided, and registered as the feature image area setting data 514 (step S38) after the step S36 of the feature image area detection process in order to implement an operation input using the dial key.

Figure 23:
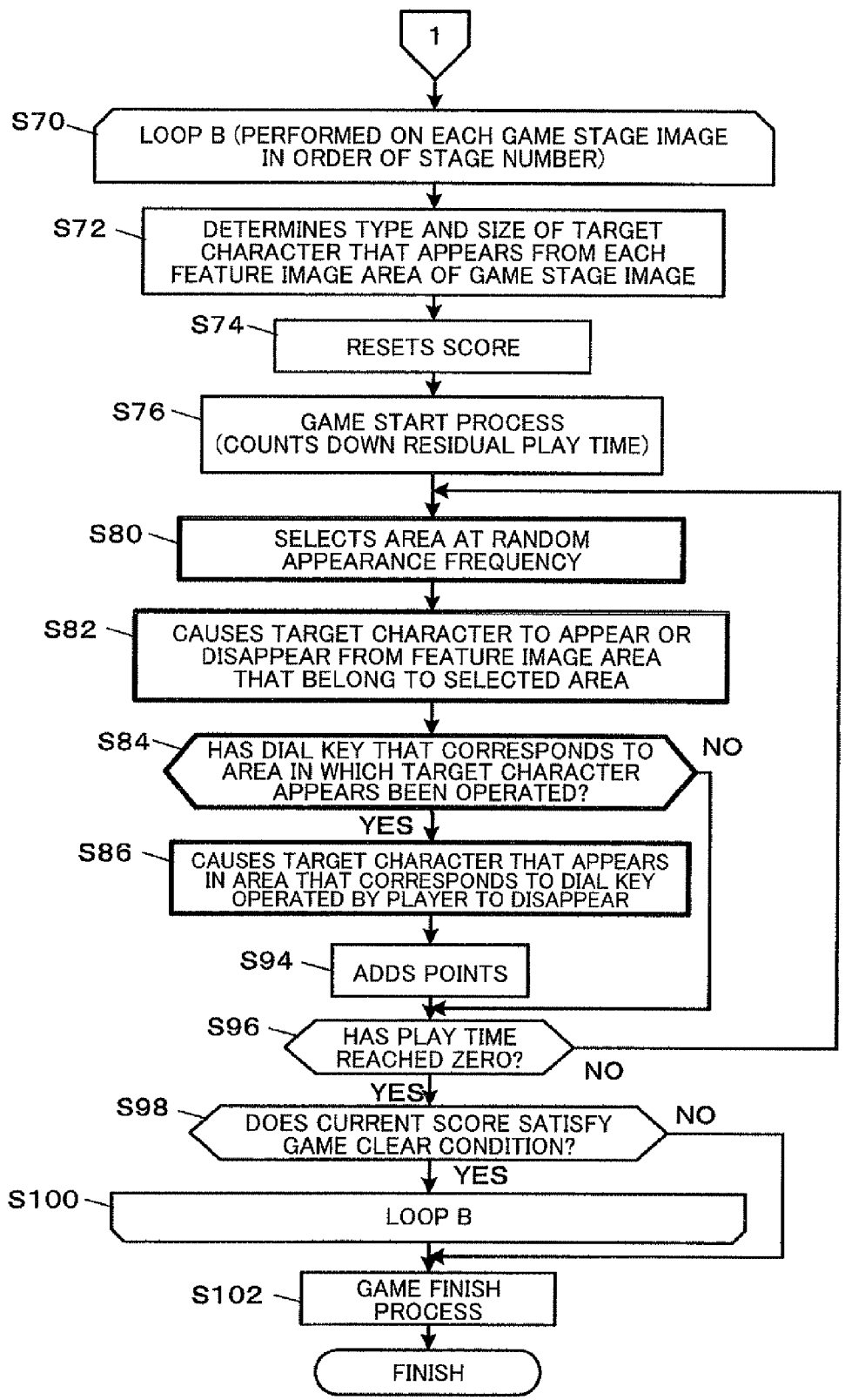
FIG. 23 is a flowchart illustrative of the flow of a loop B process according to the second embodiment.

The flow of the main process according to this embodiment differs from that of the first embodiment as to the loop B process. FIG. 23 is a flowchart illustrative of the flow of the loop B process according to this embodiment. In this embodiment, the processing section 200 executes steps S80 to S86 instead of the steps S76, S90, and S92 according to the first embodiment.

Specifically, when the game has started, the processing section 200 selects one of the areas at a random appearance frequency (step S80), and causes the target character to appear or disappear from one of the feature image areas that belong to the selected area (step S82). When the processing section 200 has detected that the player has operated the dial key that corresponds to the area in which the target character appears (YES in step S84), the processing section 200 causes the target character that appears in the area that corresponds to the dial key operated by the player to disappear (step S86), and add points to the score of the player (step S94).

According to this embodiment, the same effects as those of the first embodiment can be achieved using a device having a small screen size.

Note that the application of the method according to this embodiment (i.e., the entire image is divided into areas, and the player attacks the target character by selecting the area) is not limited to a game device that includes dial keys. For example, when using a personal computer as a game device, numeric keypads may be utilized in the same manner as dial keys. When a portable telephone does not include dial keys and displays virtual dial keys on a touch panel, the virtual dial keys may be utilized in the same manner as dial keys.

Third Embodiment

A third embodiment to which the invention is applied is described below. This embodiment is basically the same as the first embodiment, but differs from the first embodiment in that a function of displaying a guide screen when the player photographs an original two-dimensional image is provided. The elements described in connection with the first embodiment are indicated by identical symbols. The following description focuses on the difference from the first embodiment.

Figure 24:
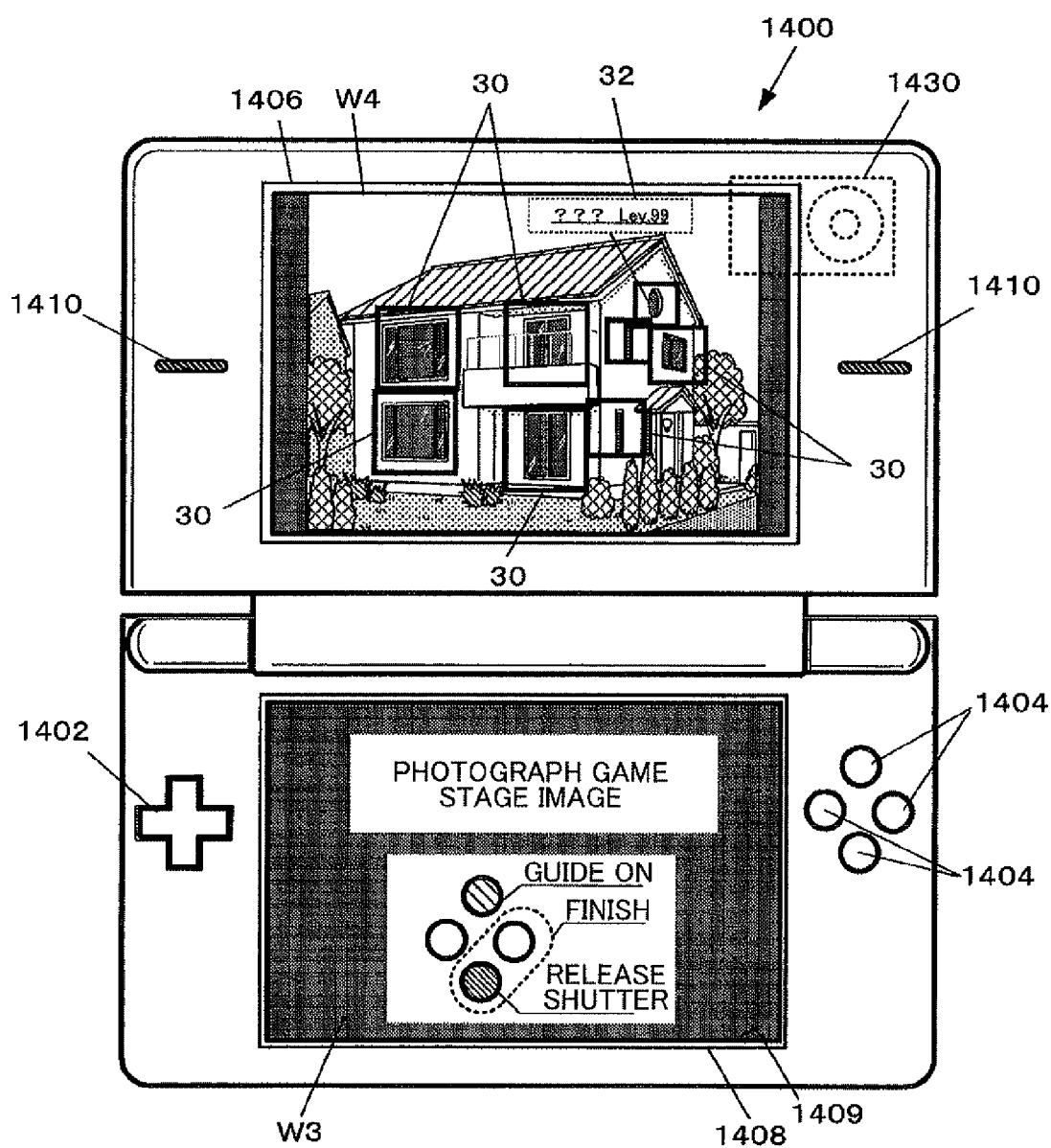
FIG. 24 is a view showing an example of a screen according to a third embodiment that is displayed when the player photographs an image used in a game.

FIG. 24 is a view showing an example of a screen according to this embodiment that is displayed when the player photographs an original two-dimensional image. In an operation guide screen W3 according to this embodiment, a guide display ON/OFF function is assigned to one of the button switches 1404. When the player has operated one of the button switches 1404 that is assigned to guide display when a live view image W4 is displayed on the first liquid crystal display 1406, the feature image area detection process is performed on the current frame of the live view image, and the target character that appears is determined, so that markers 30 that indicate the detected feature image areas and information 32 about the target character that will appear are additionally displayed on the first liquid crystal display 1406.

The functional configuration according to this embodiment is basically the same as the functional configuration according to the first embodiment, but differs from the functional configuration according to the first embodiment in that the processing section 200 includes a functional section that displays the markers 30 and the information 32.

In this embodiment, the processing section 200 executes a guided photographing process shown in FIG. 25 instead of the steps S2 to S8 (see FIG. 17) according to the first embodiment.

Specifically, the processing section 200 starts live view display (step S130). When the processing section 200 has detected that the player has operated one of the button switches 1404 that is assigned to guide display (YES in step S132), the processing section 200 extracts approximate outlines from the current frame of the live view image (step S134). The processing section 200 pre-selects an approximate outline that satisfies a given feature condition from the extracted approximate outlines (step S136), selects an approximate outline that satisfies the proper size condition from the pre-selected approximate outlines (step S138), unites the approximate outlines that satisfy the adjacency condition or the nested structure condition, and determines the area enclosed by the united approximate outline to be a feature image area (step S140).

The processing section 200 then highlights the detected feature image areas (step S142). For example, the processing section 200 displays the outline of the feature image area in a given color, paints out the feature image area in a given color, or displays a given marker 30 to enclose the feature image area (see FIG. 24).

The processing section 200 refers to the character initial setting data 504, and determines the type of target character that appears from each feature image area (step S144). When a special target character that rarely appears is included in the determined target characters (YES in step S146), the processing section 200 displays the information 32 about the special target character near the feature image area in which the special target character appears (step S148).

When the player has not operated one of the button switches 1404 that is assigned to guide display (NO in step S132), the processing section 200 skips the steps S134 to S148.

When the processing section 200 has detected that the player has performed a shutter release operation (step S150), the processing section 200 stores one frame of the live view image at the shutter release timing in the storage section 500 as the original two-dimensional image (step S152). When the processing section 200 has detected that the player has performed a given photographing finish operation, the processing section 200 finishes the guided photographing process, and returns to the step S10 (see FIG. 17).

According to this embodiment, the same effects as those of the first embodiment can be achieved. Moreover, the player can expect a game stage obtained when the player photographs the current object at the current angle.

Note that the guided photographing process according to this embodiment may also be applied to the second embodiment.

In this embodiment, the markers 30 and the information 32 are displayed when the player operates one of the button switches 1404 that is assigned to guide display. Note that guide display may be turned ON or OFF when the player has operated one of the button switches 1404 that is assigned to guide display.

Modifications

The first to third embodiments to which the invention is applied have been described above. Note that the invention is not limited thereto. Various modifications may be appropriately made, such as adding other elements, omitting some of the elements, or changing some of the elements.

For example, the game device is not limited to an electronic instrument that is sold as a game device. An electronic instrument (e.g., portable telephone, compact digital camera, or music player) that can execute application software and functions as a game device by executing a game program may be used as the game device according to the invention.

The game according to the invention is not limited to a whack-a-mole game, but may be a shooting game, an RPG, a virtual pet breeding game, or a collection game in which the player collects a virtual living creature.

For example, a pet breeding game may be configured so that a cake appears or disappears from a yellow and quadrangular feature image area, and an apple appears or disappears from a red and elliptical feature image area. In this case, the player acquires food by touching it, and feeds it to the pet. Note that the player may acquire an item used by the pet. A collection game may be configured so that the player touches and collects a virtual character (living creature) that appears from the photographed scene.

For example, instructions may be issued to the player when the player photographs an original two-dimensional image. For example, the player is instructed to photograph an image that contains a given number of feature image areas. In this case, it is preferable to present a clear condition (e.g., "You must photograph one hundred quadrangular objects!") before the player photographs an image. The original two-dimensional image thus photographed may be used as the game stage image.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A method comprising:
detecting an image area that satisfies a feature image area condition from a photographed image, the feature image area condition being a condition to detect an image area that has an outline of a given shape and satisfies a proper size condition;
displaying the photographed image on a touch panel;
selecting character type based on at least one of a color of the image area and a size of the image area;
displaying a character of the selected character type on the photographed image in a manner such that the character appears to emerge from the image area; and
incrementing a score linked to the character that has appeared from the image area when a user inputs a touch operation on the character, wherein
the detecting, the selecting, the displaying the character, and the incrementing are performed by a hardware processor.

2. The method as defined in claim 1,
the displaying the character on the photographed image includes causing the character to appear to emerge at intervals of time, from each image area that satisfies the feature image area condition, with respect to the photographed image.

3. The method as defined in claim 1,
the displaying the character on the photographed image includes causing the character to appear to emerge from the image area that satisfies the feature image area condition while increasing or decreasing the size of the character based on the size of the image area.

4. The method as defined in claim 1,
the detecting of the image area includes detecting an image area that satisfies the feature image area condition based on shape and color information about the photographed image.

5. The method as defined in claim 1, further comprising:
controlling a game process by sequentially reading the photographed image from among a plurality of photographed images.

6. The method as defined in claim 1, further comprising:
detecting the image area that satisfies the feature image area condition from each of a plurality of photographed images;
selecting an image used in a game from the plurality of photographed images based on a detection result for each of the plurality of photographed images;
displaying the selected image; and
displaying the selected character on the selected image.

7. The method as defined in claim 6, further comprising:
determining a use order of the selected based on the detected image areas;
displaying the selected image; and
displaying the selected character on the selected image based on the use order.

8. The method as defined in claim 1, further comprising:
uniting a plurality of image areas that satisfy the feature image area condition and a nested structure condition to form a single image area; and
displaying the character on the photographed image in a manner such that the character appears to emerge from within the single image area.

9. The method as defined in claim 1, further comprising:
uniting a plurality of image areas that satisfy the feature image area condition and an adjacency condition to form a single image area; and
displaying the character on the photographed image in a manner such that the character appears to emerge from within the single image area.

10. The method as defined in claim 1, further comprising:
pre-storing a plurality of characters each associated with a relative size of the image area as a percentage of the total area of the photographed image; and
selecting at least one of the plurality of characters to display on the photographed image based on the relative size.

11. The method as defined in claim 1, further comprising:
changing the size of the character relative to the image area over time.

12. A non-transitory computer-readable information storage medium storing a program, which when executed by a processor, causes a computer to execute a method comprising:
detecting an image area that satisfies a feature image area condition from a photographed image, the feature image area condition being a condition to detect an image area that has an outline of a given shape and satisfies a proper size condition;
displaying the photographed image on a touch panel;
selecting a character type based on at least one of a color of the image area and a size of the image area;
displaying a character of the selected character type on the photographed image in a manner such that the character appears to emerge from the image area; and
incrementing a score linked to the character that has appeared from the image area when a user inputs a touch operation on the character.

13. A game device that controls a game process while displaying a character on a touch panel, the game device comprising:
a processor; and
a memory storing a program that when executed causes the processor and memory to function as:
an image area detection section that detects an image area that satisfies a feature image area condition from a photographed image, the feature image area condition being a condition to detect an image area that has an outline of a given shape and satisfies a proper size condition;
an image display control section that displays the photographed image on the touch panel;

a selection section that selects a character type based on at least one of a color of the image area and a size of the image area:

a character display control section that causes a character of the selected character type to be displayed on the photographed image in a manner such that the character appears to emerge from the image area; and an incrementing section that increments a score linked to the character that has appeared from the image area when a user inputs a touch operation on the character.

* * * * *